(12) United States Patent
Rojer

(10) Patent No.: US 8,091,069 B2
(45) Date of Patent: Jan. 3, 2012

(54) MODULE SPECIFICATION LANGUAGE AND META-MODULE

(76) Inventor: Alan S. Rojer, Maplewood, NJ (US)

(*) Notice: Subject to any disclaimer, the term of this patent is extended or adjusted under 35 U.S.C. 154(b) by 1301 days.

(21) Appl. No.: 11/786,299

(22) Filed: Apr. 11, 2007

(65) Prior Publication Data

US 2007/0239773 A1  Oct. 11, 2007

Related U.S. Application Data

(60) Provisional application No. 60/791,011, filed on Apr. 11, 2006, provisional application No. 60/791,097, filed on Apr. 11, 2006.

(51) Int. Cl.
*G06F 9/44* (2006.01)

(52) U.S. Cl. ......... 717/114; 717/108; 717/115; 717/116

(58) Field of Classification Search ............... None
See application file for complete search history.

(56) References Cited

U.S. PATENT DOCUMENTS

| | | | |
|---|---|---|---|
| 4,734,854 A | 3/1988 | Afshar | |
| 5,675,801 A | 10/1997 | Lindsey | |
| 5,699,310 A | 12/1997 | Garloff | |
| 6,721,807 B2 | 4/2004 | Vlissides | |
| 6,742,175 B1 | 5/2004 | Brassard | |
| 7,076,766 B2 | 7/2006 | Wirts | |
| 7,130,863 B2 | 10/2006 | Diab | |
| 7,137,100 B2 | 11/2006 | Iborra | |
| 7,237,224 B1 | 6/2007 | Motoyama | |
| 7,293,254 B2 | 11/2007 | Bloesch | |
| 7,444,618 B2 | 10/2008 | Kulkarni | |
| 7,590,969 B2 | 9/2009 | Rajagopal | |
| 7,669,191 B1 | 2/2010 | Kelly | |
| 2004/0216085 A1* | 10/2004 | Wilson et al. | 717/108 |
| 2004/0216087 A1* | 10/2004 | Wilson et al. | 717/116 |
| 2005/0010894 A1 | 1/2005 | Potter | |
| 2005/0108683 A1* | 5/2005 | Iglesias | 717/116 |
| 2005/0166181 A1* | 7/2005 | Grieskamp et al. | 717/114 |
| 2005/0216885 A1* | 9/2005 | Ireland | 717/108 |
| 2006/0064667 A1 | 3/2006 | Freitas | |
| 2006/0064672 A1* | 3/2006 | Pandit et al. | 717/108 |
| 2006/0190927 A1* | 8/2006 | Albahari et al. | 717/114 |
| 2007/0011652 A1* | 1/2007 | Schneider | 717/116 |
| 2007/0044066 A1* | 2/2007 | Meijer et al. | 717/100 |
| 2007/0079299 A1 | 4/2007 | Daly | |

OTHER PUBLICATIONS

Robert Lafore, Object-Oriented Programming Second Edition, 1995, Waite Group Press. 24 pages.*
T. Katsimpa, Application Modeling using Reverse Engineering Techniqes, SAC'06, Apr. 23-27, 2006, ACM 1-59593-108—Feb. 6, 0004, 6 pages, <http://portal.acm.org/citation.cfm?id=1141570>.*
Jan Rothe, The Coalgebraic Class Specification Language CCSL, 2001, Journal of Universal Science, vol. 7, No. 2, 175-193, 19 pages, <http://www.jucs.org/jucs_7_2/the_coalgebraic_class_specification/Rothe_J.pdf>.*
John V. Guttag, The Larch Family of Specification Languages, 1985 IEEE, 0740-7459/85/0900/0024, 16 pages, <http://www.cs.cmu.edu/~wing/publications/Guttag-Wing85a.pdf>.*

(Continued)

*Primary Examiner* — Thuy Dao
*Assistant Examiner* — Cuong V Luu

(57) ABSTRACT

A language for the specification of object-oriented modules is disclosed. The specification language is processed by a computer-implemented parser to produce an object-oriented data structure. Expressions in the specification language may include specifications of modules, classes, and class members. Expressions in the specification language may include predicate expressions which permit general-purpose declarative specifications pertaining to modules, classes, and members.

4 Claims, 22 Drawing Sheets

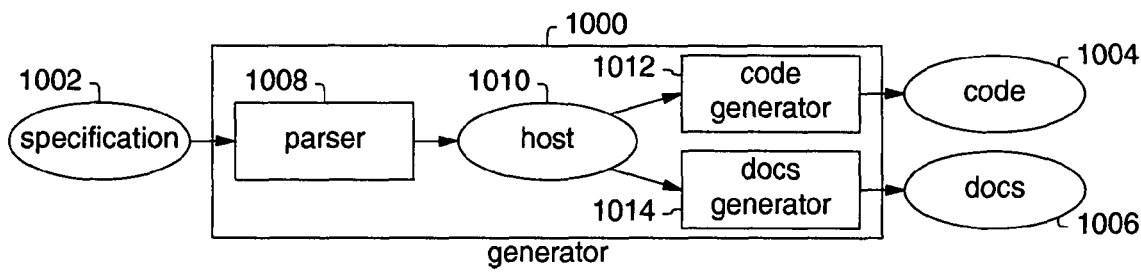

OTHER PUBLICATIONS

Darrell Reimer, Validating Structural Properties of Nested Objects, OOPSLA'04 Oct. 24-28, 2008, ACM 1-58113-833—Apr. 4, 2010, 11 pages, <http://portal.acm.org/citation.cfm?id=1028774>.*

Parnas, A Technique for Software Module Specification . . . , Comm. ACM 15:5, May 1972, pp. 330-336.

Buckles, Formal Module-Level Specifications, Proc. 1977 ACM Annual Conf., pp. 138-144.

Discepolo, Towards a Practical Specification Language, Proc. 1981 ACM Annual Conf., pp. 144-153.

Wasserman, The Object-Oriented Structured Design for Software Design Representation, Computer 23:3, Mar. 1990, 50-63.

Dedene, M.E.R.O.DE: A Model-driven Entity-Relationship Object-Oriented DEvelopment method, ACM SIGSOFT Software Engineering Notes 19:3, Jul. 1993, pp. 51-61.

Gamma, Design Patterns, Addison Wesley, Reading, MA, 1995, pp. 331-344.

Cowan, Abstract Data Views: An Interface Specification Concept to Enhance Design for Reuse, IEEE Trans. on Software Engineering 21:3, Mar. 1995, pp. 229-243.

Palsberg, The Essence of the Visitor Pattern, 22nd International Computer Software and Application Conference, 1998, pp. 9 (IEEE Computer Society).

Mellor, Model-Driven.Development, IEEE Software 20:5, Sep./Oct. 2003, pp. 14-18.

Bell, Death By UML Fever, ACM Queue 2:1, Mar. 2004, pp. 73-81.

Budinsky, Eclipse Modeling Framework, Addison-Wesley, Boston MA, 2004, pp. 95-113, 161-212.

Fowler, JeeWiz! Meta-Programming for the Real World, New Technology/enterprise Ltd, Nov. 2004, http://www.jeewiz.com/white_papers/TalkNotes_OOPSLA2004.pdf.

Object Management Group, Meta Object Facility (MOF) Core Specification, Version 2.0, formal/Jun. 1, 2001, Jan. 2006, http://www.omg.org/spec/MOF/2.0/PDF/.

Balasubramanian, Developing Applications Using Model-Driven Design Environments, Computer 39:2, Feb. 2006, pp. 33-40.

Stahl, Model-Driven Software Development, John Wiley & Sons, Ltd., 2006, pp. 85-118.

Jackson, Alloy: A Lightweight Object Modelling Notation, ACM Trans. Software Engineering, 11:2, Apr. 2002, pp. 256-290.

* cited by examiner

FIG. 1

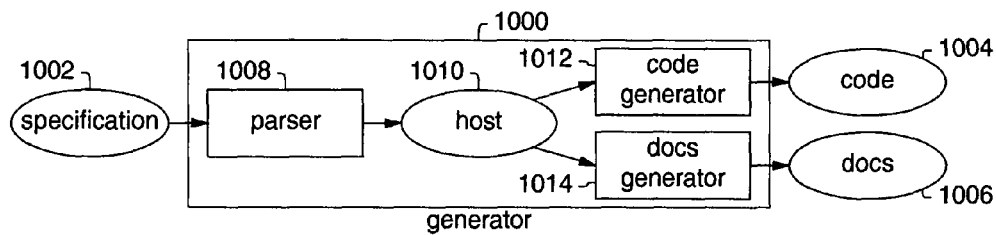

FIG. 2

```
dish¹⁰¹⁶ [ host dishHost¹⁰¹⁸ ] {
  Sequence<dishModule¹⁰²⁸> modules¹⁰²⁰ [meron];
  Sequence<dishType¹⁰⁵⁴> types¹⁰²² [meron];
  dishElement¹⁰²⁴ {
    dishEntity¹⁰²⁶ {
      dishModule¹⁰²⁸ {
        Sequence<dishClass¹⁰³⁶> classes¹⁰³⁰ [meron];
        Sequence<dishClass¹⁰³⁶> forward_classes¹⁰³² [meron];
        dishHostClass¹⁰⁴⁰ host¹⁰³⁴ [meron];
      }
      dishClass¹⁰³⁶ {
        Sequence<dishMember¹⁰⁴⁶> members¹⁰³⁸ [meron];
        dishHostClass¹⁰⁴⁰ {}
      }
      dishOperand¹⁰⁴² {
        dishArgument¹⁰⁴⁴ {}
        dishMember¹⁰⁴⁶ {
          dishMemberFunction¹⁰⁴⁸ {
            Sequence<dishArgument¹⁰⁴⁴> arguments¹⁰⁵⁰ [meron];
          }
          dishMemberDatum¹⁰⁵² {}
        }
      }
    }
  }
}
```

FIG. 3

```
dish¹⁰¹⁶::::dishElement¹⁰²⁴ {
  dishType¹⁰⁵⁴ {
    dishVoidType¹⁰⁵⁶ {}
    dishValueType¹⁰⁵⁸ {
      dishBitType¹⁰⁶⁰ {}
      dishIntegerType¹⁰⁶² {}
      dishCardinalType¹⁰⁶⁴ {}
      dishTextType¹⁰⁶⁶ {}
    }
    dishReferenceType¹⁰⁶⁸ {}
    dishCompoundType¹⁰⁷⁰ {
      dishSequenceType¹⁰⁷² {
        dishValueSequenceType¹⁰⁷⁴ {}
        dishReferenceSequenceType¹⁰⁷⁶ {}
      }
      dishSetType¹⁰⁷⁸ {
        dishValueSetType¹⁰⁸⁰ {}
        dishReferenceSetType¹⁰⁸² {}
      }
      dishMapType¹⁰⁸⁴ {
        dishIndexMapType¹⁰⁸⁶ {}
        dishScaleMapType¹⁰⁸⁸ {}
        dishBindMapType¹⁰⁹⁰ {}
        dishConvertMapType¹⁰⁹² {}
      }
    }
  }
}
dish¹⁰¹⁶ { dimeLogger¹⁰⁹⁴ } {}
```

FIG. 4

```
class dishHost¹⁰¹⁸ {
public: // features...
  Sequence<dishModule¹⁰²⁸*> modules¹⁰²⁰;
  dishModule¹⁰²⁸* module¹⁰⁹⁶(Text t);
  Map<Text, dishModule¹⁰²⁸*> module_index¹⁰⁹⁸;
  Boolean accept_module¹¹⁰⁰(dishModule¹⁰²⁸* m);
  Sequence<dishType¹⁰⁵⁴*> types¹⁰²²;
  Boolean accept_type¹¹⁰²(dishType¹⁰⁵⁴* arg_0);
};
```

FIG. 5

```
class dishElement¹⁰²⁴ {
public: // features...
   Text source¹¹⁰⁴;
};
```

FIG. 6

```
class dishEntity¹⁰²⁶ : public dishElement¹⁰²⁴ {
public: // features...
   Text id¹¹⁰⁶;
   Text term¹¹⁰⁸;
   Text title¹¹¹⁰;
   Text purpose¹¹¹²;
   Text passage¹¹¹⁴;
   Sequence<Text> remarks¹¹¹⁶;
   Sequence<Text> notes¹¹¹⁸;
};
```

*FIG. 7*

```
class dishModule1028 : public dishEntity1026 {
public: // features...
   Sequence<dishClass1036*> classes1030;
   Map<Text, dishClass1036*> class_index1120;
   Boolean accept_class1122(dishClass1036* c);
   dishClass1036* resolve_class1124(Text id);
   Boolean sort_classes1126(dimeLogger1094* arg_0);
   Sequence<dishClass1036*> forward_classes1032;
   Boolean accept_forward_class1128(dishClass1036* f);
   Sequence<dishClass1036*> root_classes1132;
   dishHostClass1040* host1034;
   Boolean accept_host1134(dishHostClass1040* h);
   Text viewer_id1136;
   Text editor_id1138;
   Text factory_id1140;
   Text factory_root_id1142;
   Text auditor_id1144;
   Text reflector_id1146;
   Text parser_id1148;
   Text resolver_id1150;
   Text resolver_root_id1154;
   Text resolver_id_field1152;
   Text acceptor_id1156;
   Text predicator_id1158;
   Text qualifier_id1160();
   Text singleton_id1162();
   Text plurality_id1164();
   Text predicator_sequence_id1166();
   Text promissary_reference_id1168();
   Text depository_id1170();
   Text predicator_host_id1172;
public: // cleanup...
   virtual ~dishModule1028() {
      /* cleanup classes1030 */
      /* cleanup forward_classes1032 */
      /* cleanup host1034 */ }
};
```

FIG. 8

```
class dishClass^1036 : public dishEntity^1026 {
public: // features...
   dishModule^1028* module^1174;
   Sequence<dishClass^1036*> genera^1176;
   Sequence<dishMember^1046*> members^1038;
   Map<Text, dishMember^1046*> member_index^1178;
   Sequence<dishClass^1036*> species^1180;
   Sequence<dishClass^1036*> genera_closure^1182;
   Sequence<dishClass^1036*> species_closure^1184;
   Boolean is_module_root^1186;
   Boolean constructs_markup_element^1188;
   Boolean accepts_markup_element^1190;
   Boolean accepts_markup_text^1192;
   Boolean accepts_markup_predicate^1194;
   Boolean markup_configure^1196;
   Boolean markup_commit^1198;
   Boolean is_pure_abstract^1200;
   Boolean accept_member^1202(dishMember^1046* arg_0);
   Boolean provides_downcast^1204;
   Sequence<Text> tags^1206;
   Text acceptor_host_id^1208();
   Sequence<Text> audit_requirements^1210;
   Text auditor_context^1214;
public: // cleanup...
   virtual ~dishClass^1036() {
      /* cleanup members^1038 */ }
};
```

FIG. 9

```
class dishHostClass^1040 : public dishClass^1036 {};
```

FIG. 10

```
class dishOperand^1042 : public dishEntity^1026 {
public: // features...
   Text scope_handle^1216;
   Boolean validate_handle^1218(Text h);
   Boolean accept_scope_handle^1220(Text h);
   Text scope_id^1222;
   Boolean is_const^1224;
   dishType^1054* type^1226;
};
```

FIG. 11

```
class dishArgument¹⁰⁴⁴ : public dishOperand¹⁰⁴² {
public: // features...
  Cardinal position¹²²⁸;
  Text arg_default¹²³⁰;
};
```

FIG. 12

```
class dishMember¹⁰⁴⁶ : public dishOperand¹⁰⁴² {
public: // features...
  dishClass¹⁰³⁶* member_class¹²³²;
};
```

FIG. 13

```
class dishMemberFunction¹⁰⁴⁸ : public dishMember¹⁰⁴⁶ {
public: // features...
  Boolean is_static¹²³⁴;
  Boolean is_virtual¹²³⁶;
  Boolean is_pure¹²³⁸;
  Sequence<dishArgument¹⁰⁴⁴*> arguments¹⁰⁵⁰;
  Sequence<Text> inline_definition¹²⁴⁰;
  Sequence<Text> definition¹²⁴²;
  Text indicates¹²⁴⁴;
public: // cleanup...
  virtual ~dishMemberFunction¹⁰⁴⁸() {
    /* cleanup arguments¹⁰⁵⁰ */ }
};
```

FIG. 14

```
class dishMemberDatum^1052 : public dishMember^1046 {
public: // features...
  Boolean is_meron^1246;
  Boolean is_mutable^1248;
  Text init^1250;
  Text predicator_class_id^1252();
  Text promissary_class_id^1254();
  Text acceptor_class_id^1256();
  Text generic_acceptor_id^1258();
  dishMemberFunction^1048* acceptor^1260;
  Boolean inhibit_predicator^1262;
  Sequence<Text> tags^1264;
  Sequence<Text> handles^1266;
  Boolean accept_handle^1268(Text t);
};
```

FIG. 15

```
class dishType^1054 : public dishElement^1024 {
public: // features...
  Text type_text^1270();
  Boolean is_plural^1272();
};
```

FIG. 16

```
class dishVoidType^1056 : public dishType^1054 {
public: // features...
  Text type_text^1274();
};
```

*FIG. 17*

```
class dishValueType¹⁰⁵⁸ : public dishType¹⁰⁵⁴ {};
```

*FIG. 18*

```
class dishBitType¹⁰⁶⁰ : public dishValueType¹⁰⁵⁸ {
public: // features...
   Text type_text¹²⁷⁶();
};
```

*FIG. 19*

```
class dishIntegerType¹⁰⁶² : public dishValueType¹⁰⁵⁸ {
public: // features...
   Text type_text¹²⁷⁸();
};
```

*FIG. 20*

```
class dishCardinalType¹⁰⁶⁴ : public dishValueType¹⁰⁵⁸ {
public: // features...
   Text type_text¹²⁸⁰();
};
```

*FIG. 21*

```
class dishTextType¹⁰⁶⁶ : public dishValueType¹⁰⁵⁸ {
public: // features...
   Text type_text¹²⁸²();
};
```

*FIG. 22*

```
class dishReferenceType¹⁰⁶⁸ : public dishType¹⁰⁵⁴ {
public: // features...
   Text reference_class_id¹²⁸⁴;
   Text type_text¹²⁸⁶();
};
```

*FIG. 23*

```
class dishCompoundType^1070 : public dishType^1054 {
public: // features...
  Sequence<dishType^1054*> parameters^1288;
  Text type_text^1290();
  Text compound_text^1292();
  Boolean is_plural^1294();
  dishType^1054* range^1296;
};
```

*FIG. 24*

```
class dishSequenceType^1072 : public dishCompoundType^1070 {
public: // features...
  Text compound_text^1298();
};
```

*FIG. 25*

```
class dishValueSequenceType^1074 : public dishSequenceType^1072 {
public: // features...
  dishValueType^1058* value_range^1300;
};
```

*FIG. 26*

```
class dishReferenceSequenceType^1076 : public dishSequenceType^1072 {
public: // features...
  dishReferenceType^1068* reference_range^1302;
};
```

*FIG. 27*

```
class dishSetType¹⁰⁷⁸ : public dishCompoundType¹⁰⁷⁰ {
public: // features...
   Text compound_text¹³⁰⁴();
};
```

*FIG. 28*

```
class dishValueSetType¹⁰⁸⁰ : public dishSetType¹⁰⁷⁸ {
public: // features...
   dishValueType¹⁰⁵⁸* value_range¹³⁰⁶;
};
```

*FIG. 29*

```
class dishReferenceSetType¹⁰⁸² : public dishSetType¹⁰⁷⁸ {
public: // features...
   dishReferenceType¹⁰⁶⁸* reference_range¹³⁰⁸;
};
```

FIG. 30

```
class dishMapType^1084 : public dishCompoundType^1070 {
public: // features...
   dishType^1054* domain^1310;
   Text compound_text^1312();
};
```

FIG. 31

```
class dishIndexMapType^1086 : public dishMapType^1084 {
public: // features...
   dishValueType^1058* value_domain^1314;
   dishReferenceType^1068* reference_range^1316;
};
```

FIG. 32

```
class dishScaleMapType^1088 : public dishMapType^1084 {
public: // features...
   dishReferenceType^1068* reference_domain^1318;
   dishValueType^1058* value_range^1320;
};
```

FIG. 33

```
class dishBindMapType^1090 : public dishMapType^1084 {
public: // features...
   dishReferenceType^1068* reference_domain^1322;
   dishReferenceType^1068* reference_range^1324;
};
```

FIG. 34

```
class dishConvertMapType^1092 : public dishMapType^1084 {
public: // features...
   dishValueType^1058* value_domain^1326;
   dishValueType^1058* value_range^1328;
};
```

FIG. 35

```
class dimeLogger^1094 {};
```

FIG. 36

1002 Lexer INITIAL[1348] Matches

| Match | Regexp | Terminal | Responder | Next |
|---|---|---|---|---|
| 1356 | #.*$ | | | |
| 1358 | [ \t]+ | | | |
| 1360 | \n | | newline[1362] | |
| 1364 | "::" | SCOPE[1366] | | |
| 1368 | "{" | OPEN_CURLY[1370] | | |
| 1372 | "}" | CLOSE_CURLY[1374] | | |
| 1376 | "[" | OPEN_SQUARE[1378] | | |
| 1380 | "]" | CLOSE_SQUARE[1382] | | |
| 1384 | "(" | OPEN_PAREN[1386] | | |
| 1388 | ")" | CLOSE_PAREN[1390] | | |
| 1392 | "<" | OPEN_ANGLE[1394] | | |
| 1396 | ">" | CLOSE_ANGLE[1398] | | |
| 1400 | ";" | SEMICOLON[1402] | | |
| 1404 | "," | COMMA[1406] | | |
| 1408 | "\"" | | quote_open[1410] | DOUBLE_QUOTE[1350] |
| 1412 | "'" | | quote_open[1410] | SINGLE_QUOTE[1352] |
| 1414 | "`" | | quote_open[1410] | MULTI_QUOTE[1354] |
| 1416 | [Vv]oid | VOID[1418] | void_type[1420] | |
| 1422 | [Ii]nt(eger)? | INT[1424] | int_type[1426] | |
| 1428 | [Bb]it\|[Bb]ool(ean)? | BIT[1430] | bit_type[1432] | |
| 1434 | [Cc]ard(inal)? | CARD[1436] | card_type[1438] | |
| 1440 | [Tt]ext(ual)? | TEXT[1442] | text_type[1444] | |
| 1446 | [Ss]et | SET[1448] | | |
| 1450 | [Mm]ap | MAP[1452] | | |
| 1454 | [Ss]eq(uence)? | SEQ[1456] | | |
| 1458 | [a-zA-Z0-9_]+ | ID[1460] | id[1462] | |
| 1464 | | | bad_char[1466] | |

*FIG. 37*

1002 Predicate Relations (1/2)

| Match | Regexp | Terminal | Responder |
|---|---|---|---|
| 1468 | acceptor | SINGLETON[1470] | acceptor_predicate[1472] |
| 1474 | acceptor-id | SINGLETON[1470] | acceptor_id_predicate[1476] |
| 1478 | accept-element | QUALIFIER[1480] | accepts_markup_element_predicate[1482] |
| 1484 | accept-predicate | QUALIFIER[1480] | accepts_markup_predicate_predicate[1486] |
| 1488 | accept-text | QUALIFIER[1480] | accepts_markup_text_predicate[1490] |
| 1492 | default | SINGLETON[1470] | arg_default_predicate[1494] |
| 1496 | predicator | SINGLETON[1470] | predicator_id_predicate[1498] |
| 1500 | audit | PLURALITY[1502] | audit_requirements_predicate[1504] |
| 1506 | require | PLURALITY[1502] | audit_requirements_predicate[1504] |
| 1508 | auditor-context | SINGLETON[1470] | auditor_context_predicate[1510] |
| 1512 | auditor | SINGLETON[1470] | auditor_id_predicate[1514] |
| 1516 | construct-element | QUALIFIER[1480] | constructs_markup_element_predicate[1518] |
| 1520 | definition | PLURALITY[1502] | definition_predicate[1522] |
| 1524 | editor | SINGLETON[1470] | editor_id_predicate[1526] |
| 1528 | factory | SINGLETON[1470] | factory_id_predicate[1530] |
| 1532 | factory-root | SINGLETON[1470] | factory_root_id_predicate[1534] |
| 1536 | forward | PLURALITY[1502] | forward_classes_predicate[1538] |
| 1540 | handle | PLURALITY[1502] | handles_predicate[1542] |
| 1544 | handles | PLURALITY[1502] | handles_predicate[1542] |
| 1546 | host | SINGLETON[1470] | host_predicate[1548] |
| 1550 | indicates | SINGLETON[1470] | indicates_predicate[1552] |
| 1554 | inhibit-predicator | QUALIFIER[1480] | inhibit_predicator_predicate[1556] |
| 1558 | init | SINGLETON[1470] | init_predicate[1560] |
| 1562 | inline | PLURALITY[1502] | inline_definition_predicate[1564] |

*FIG. 38*

1002 Predicate Relations (2/2)

| Match | Regexp | Terminal | Responder |
|---|---|---|---|
| 1566 | const | QUALIFIER[1480] | is_const_predicate[1568] |
| 1570 | meron | QUALIFIER[1480] | is_meron_predicate[1572] |
| 1574 | mutable | QUALIFIER[1480] | is_mutable_predicate[1576] |
| 1578 | pure | QUALIFIER[1480] | is_pure_predicate[1580] |
| 1582 | static | QUALIFIER[1480] | is_static_predicate[1584] |
| 1586 | virtual | QUALIFIER[1480] | is_virtual_predicate[1588] |
| 1590 | commit | QUALIFIER[1480] | markup_commit_predicate[1592] |
| 1594 | configure | QUALIFIER[1480] | markup_configure_predicate[1596] |
| 1598 | note | PLURALITY[1502] | notes_predicate[1600] |
| 1602 | notes | PLURALITY[1502] | notes_predicate[1600] |
| 1604 | parser | SINGLETON[1470] | parser_id_predicate[1606] |
| 1608 | passage | SINGLETON[1470] | passage_predicate[1610] |
| 1612 | downcast | QUALIFIER[1480] | provides_downcast_predicate[1614] |
| 1616 | purpose | SINGLETON[1470] | purpose_predicate[1618] |
| 1620 | reflector | SINGLETON[1470] | reflector_id_predicate[1622] |
| 1624 | remark | PLURALITY[1502] | remarks_predicate[1626] |
| 1628 | remarks | PLURALITY[1502] | remarks_predicate[1626] |
| 1630 | resolver | SINGLETON[1470] | resolver_id_predicate[1632] |
| 1634 | resolver-id-field | SINGLETON[1470] | resolver_id_field_predicate[1636] |
| 1638 | resolver-root | SINGLETON[1470] | resolver_root_id_predicate[1640] |
| 1642 | tag | PLURALITY[1502] | tags_predicate[1644] |
| 1646 | tags | PLURALITY[1502] | tags_predicate[1644] |
| 1648 | term | SINGLETON[1470] | term_predicate[1650] |
| 1652 | title | SINGLETON[1470] | title_predicate[1654] |
| 1656 | viewer | SINGLETON[1470] | viewer_id_predicate[1658] |

FIG. 39

1002 Lexer DOUBLE_QUOTE[1350] Matches

| Match | Regexp | Terminal | Responder | Next |
|---|---|---|---|---|
| 1660 | "\"" | QUOTE[1662] | quote_close[1664] | INITIAL[1348] |
| 1666 | "\\\"" | | escape_doublequote[1668] | |
| 1670 | "\\n" | | escape_newline[1672] | |
| 1674 | "\\t" | | escape_tab[1676] | |
| 1678 | "\\\\" | | escape_escape[1680] | |
| 1682 | \n | | quote_newline[1684] | |
| 1686 | . | | quote_accumulate[1688] | |

FIG. 40

1002 Lexer SINGLE_QUOTE[1352] Matches

| Match | Regexp | Terminal | Responder | Next |
|---|---|---|---|---|
| 1690 | "'" | QUOTE[1662] | quote_close[1664] | INITIAL[1348] |
| 1692 | "\\'" | | escape_singlequote[1694] | |
| 1696 | "\\n" | | escape_newline[1672] | |
| 1698 | "\\t" | | escape_tab[1676] | |
| 1700 | "\\\\" | | escape_escape[1680] | |
| 1702 | \n | | quote_newline[1684] | |
| 1704 | . | | quote_accumulate[1688] | |

FIG. 41

1002 Lexer MULTI_QUOTE[1354] Matches

| Match | Regexp | Terminal | Responder | Next |
|---|---|---|---|---|
| 1706 | "`}" | QUOTE[1662] | quote_close[1664] | INITIAL[1348] |
| 1708 | "\\`" | | escape_backquote[1710] | |
| 1712 | "\\n" | | escape_newline[1672] | |
| 1714 | "\\t" | | escape_tab[1676] | |
| 1716 | "\\\\" | | escape_escape[1680] | |
| 1718 | \n | | accum_newline[1720] | |
| 1722 | . | | quote_accumulate[1688] | |

*FIG. 42*

1002 Grammar Rules (1/5)

| Rule | Production | Responder |
|---|---|---|
| 1724 | start$^{1726}$ : | |
| 1728 | start$^{1726}$ : start$^{1726}$ module$^{1730}$ | accept_module$^{1732}$ |
| 1734 | start$^{1726}$ : start$^{1726}$ scoped_class$^{1736}$ | |
| 1738 | module$^{1730}$ : module_body$^{1740}$ CLOSE_CURLY$^{1374}$ | |
| 1742 | module_body$^{1740}$ : <br> ID$^{1460}$ optional_predicates$^{1744}$ OPEN_CURLY$^{1370}$ | new_module$^{1746}$ |
| 1748 | module_body$^{1740}$ : module_body$^{1740}$ class$^{1750}$ | module_accept_class$^{1752}$ |
| 1754 | module_body$^{1740}$ : module_body$^{1740}$ members$^{1756}$ | module_accept_members$^{1758}$ |
| 1760 | module_body$^{1740}$ : module_body$^{1740}$ predicates$^{1762}$ | module_accept_predicates$^{1764}$ |
| 1766 | scoped_class$^{1736}$ : <br> scoped_class_body$^{1768}$ CLOSE_CURLY$^{1374}$ | |
| 1770 | scoped_class_body$^{1768}$ : <br> ID$^{1460}$ SCOPE$^{1366}$ ID$^{1460}$ OPEN_CURLY$^{1370}$ | resolve_scoped_class$^{1772}$ |
| 1774 | scoped_class_body$^{1768}$ : <br> scoped_class_body$^{1768}$ class$^{1750}$ | class_accept_class$^{1776}$ |
| 1778 | scoped_class_body$^{1768}$ : <br> scoped_class_body$^{1768}$ members$^{1756}$ | class_accept_members$^{1780}$ |

*FIG. 43*

1002 Grammar Rules (2/5)

| Rule | Production | Responder |
|---|---|---|
| 1782 | $class^{1750}$ : $class\_body^{1784}$ $CLOSE\_CURLY^{1374}$ | |
| 1786 | $class\_body^{1784}$ : $ID^{1460}$ $optional\_predicates^{1744}$ $OPEN\_CURLY^{1370}$ | $new\_class^{1788}$ |
| 1790 | $class\_body^{1784}$ : $class\_body^{1784}$ $class^{1750}$ | $class\_accept\_class^{1776}$ |
| 1792 | $class\_body^{1784}$ : $class\_body^{1784}$ $members^{1756}$ | $class\_accept\_members^{1780}$ |
| 1794 | $class\_body^{1784}$ : $class\_body^{1784}$ $predicates^{1762}$ | $class\_accept\_predicates^{1796}$ |
| 1798 | $members^{1756}$ : $members\_body^{1800}$ $SEMICOLON^{1402}$ | |
| 1802 | $members\_body^{1800}$ : $type^{1804}$ $member^{1806}$ | $new\_members^{1808}$ |
| 1810 | $members\_body^{1800}$ : $members\_body^{1800}$ $COMMA^{1406}$ $member^{1806}$ | $append\_members^{1812}$ |
| 1814 | $member^{1806}$ : $datum^{1816}$ | |
| 1818 | $member^{1806}$ : $method^{1820}$ | |
| 1822 | $datum^{1816}$ : $ID^{1460}$ $optional\_predicates^{1744}$ | $new\_datum^{1824}$ |
| 1826 | $method^{1820}$ : $ID^{1460}$ $args^{1828}$ $optional\_predicates^{1744}$ | $new\_method^{1830}$ |
| 1832 | $args^{1828}$ : $OPEN\_PAREN^{1386}$ $CLOSE\_PAREN^{1390}$ | $empty\_args^{1834}$ |
| 1836 | $args^{1828}$ : $args\_body^{1838}$ $CLOSE\_PAREN^{1390}$ | |
| 1840 | $args\_body^{1838}$ : $OPEN\_PAREN^{1386}$ $arg^{1842}$ | $new\_args^{1844}$ |
| 1846 | $args\_body^{1838}$ : $args\_body^{1838}$ $COMMA^{1406}$ $arg^{1842}$ | $append\_args^{1848}$ |
| 1850 | $arg^{1842}$ : $type^{1804}$ $optional\_predicates^{1744}$ | $new\_mod\_arg^{1852}$ |
| 1854 | $arg^{1842}$ : $type^{1804}$ $ID^{1460}$ $optional\_predicates^{1744}$ | $new\_mod\_arg\_dummy^{1856}$ |

FIG. 44

1002 Grammar Rules (3/5)

| Rule | Production | Responder |
|---|---|---|
| 1858 | optional_predicates$^{1744}$ : | empty_predicates$^{1860}$ |
| 1862 | optional_predicates$^{1744}$ : predicates$^{1762}$ | |
| 1864 | predicates$^{1762}$ : predicates_body$^{1866}$ CLOSE_SQUARE$^{1382}$ | |
| 1868 | predicates_body$^{1866}$ : OPEN_SQUARE$^{1378}$ predicate$^{1870}$ | new_predicates$^{1872}$ |
| 1874 | predicates_body$^{1866}$ : <br>     predicates_body$^{1866}$ SEMICOLON$^{1402}$ predicate$^{1870}$ | append_predicate$^{1876}$ |
| 1878 | predicates_body$^{1866}$ : predicates_body$^{1866}$ SEMICOLON$^{1402}$ | |
| 1880 | predicate$^{1870}$ : qualifier$^{1882}$ | |
| 1884 | predicate$^{1870}$ : singleton$^{1886}$ | |
| 1888 | predicate$^{1870}$ : plurality$^{1890}$ | |
| 1892 | qualifier$^{1882}$ : QUALIFIER$^{1480}$ | |
| 1894 | singleton$^{1886}$ : SINGLETON$^{1470}$ object$^{1896}$ | singleton_object$^{1898}$ |
| 1900 | plurality$^{1890}$ : PLURALITY$^{1502}$ object$^{1896}$ | plurality_object$^{1902}$ |
| 1904 | plurality$^{1890}$ : plurality$^{1890}$ COMMA$^{1406}$ object$^{1896}$ | plurality_append_object$^{1906}$ |
| 1908 | plurality$^{1890}$ : plurality$^{1890}$ COMMA$^{1406}$ | |
| 1910 | object$^{1896}$ : text$^{1912}$ | |
| 1914 | object$^{1896}$ : object$^{1896}$ text$^{1912}$ | append_object_text$^{1916}$ |
| 1918 | text$^{1912}$ : ID$^{1460}$ | |
| 1920 | text$^{1912}$ : QUOTE$^{1662}$ | |

FIG. 45

1002 Grammar Rules (4/5)

| Rule | Production | Responder |
|---|---|---|
| 1922 | $\text{type}^{1804}$ : $\text{VOID}^{1418}$ | |
| 1924 | $\text{type}^{1804}$ : $\text{compound\_type}^{1926}$ | |
| 1928 | $\text{type}^{1804}$ : $\text{reference\_type}^{1930}$ | |
| 1932 | $\text{type}^{1804}$ : $\text{value\_type}^{1934}$ | |
| 1936 | $\text{reference\_type}^{1930}$ : $\text{ID}^{1460}$ | $\text{reference\_type}^{1938}$ |
| 1940 | $\text{value\_type}^{1934}$ : $\text{BIT}^{1430}$ | |
| 1942 | $\text{value\_type}^{1934}$ : $\text{INT}^{1424}$ | |
| 1944 | $\text{value\_type}^{1934}$ : $\text{CARD}^{1436}$ | |
| 1946 | $\text{value\_type}^{1934}$ : $\text{TEXT}^{1442}$ | |

*FIG. 46*

1002 Grammar Rules (5/5)

| Rule | Production | Responder |
|---|---|---|
| 1948 | compound_type$^{1926}$ :<br>   SEQ$^{1456}$ OPEN_ANGLE$^{1394}$ reference_type$^{1930}$ CLOSE_ANGLE$^{1398}$ | reference_seq_type$^{1950}$ |
| 1952 | compound_type$^{1926}$ :<br>   SEQ$^{1456}$ OPEN_ANGLE$^{1394}$ value_type$^{1934}$ CLOSE_ANGLE$^{1398}$ | value_seq_type$^{1954}$ |
| 1956 | compound_type$^{1926}$ :<br>   SET$^{1448}$ OPEN_ANGLE$^{1394}$ reference_type$^{1930}$ CLOSE_ANGLE$^{1398}$ | reference_set_type$^{1958}$ |
| 1960 | compound_type$^{1926}$ :<br>   SET$^{1448}$ OPEN_ANGLE$^{1394}$ value_type$^{1934}$ CLOSE_ANGLE$^{1398}$ | value_set_type$^{1962}$ |
| 1964 | compound_type$^{1926}$ :<br>   MAP$^{1452}$ OPEN_ANGLE$^{1394}$ value_type$^{1934}$ COMMA$^{1406}$<br>      reference_type$^{1930}$ CLOSE_ANGLE$^{1398}$ | index_map_type$^{1966}$ |
| 1968 | compound_type$^{1926}$ :<br>   MAP$^{1452}$ OPEN_ANGLE$^{1394}$ value_type$^{1934}$ COMMA$^{1406}$<br>      value_type$^{1934}$ CLOSE_ANGLE$^{1398}$ | convert_map_type$^{1970}$ |
| 1972 | compound_type$^{1926}$ :<br>   MAP$^{1452}$ OPEN_ANGLE$^{1394}$ reference_type$^{1930}$ COMMA$^{1406}$<br>      reference_type$^{1930}$ CLOSE_ANGLE$^{1398}$ | bind_map_type$^{1974}$ |
| 1976 | compound_type$^{1926}$ :<br>   MAP$^{1452}$ OPEN_ANGLE$^{1394}$ reference_type$^{1930}$ COMMA$^{1406}$<br>      value_type$^{1934}$ CLOSE_ANGLE$^{1398}$ | scale_map_type$^{1978}$ |

*FIG. 47*

```
# example module specification...
mscan¹⁹⁸⁰ [ # example module predicates specification...
  # example singleton predicate specification...
  host [mscanHost];
  viewer [mscanViewer]
] {
  # example host member specification...
  Set<mscanFile¹⁹⁸⁴> _root_files¹⁹⁸² [meron];
  # example class specification...
  mscanFile¹⁹⁸⁴ {
    # example class members specification...
    mscanDirectory¹⁹⁸⁶ _parent¹⁹⁹⁶;
    Text _name¹⁹⁹⁸;
    # example class specification, indicating specialization...
    mscanDirectory¹⁹⁸⁶
      # example class members specification,
      # example member specification with member predicates specification...
      Set<mscanFile¹⁹⁸⁴> _files²⁰⁰⁰ [meron];
      mscanTopDirectory¹⁹⁸⁸ {}
    }
    mscanRegularFile¹⁹⁹⁰ {
      mscanAudioFile¹⁹⁹² {}
      mscanVideoFile¹⁹⁹⁴ {}
    }
  }
}
```

MODULE SPECIFICATION LANGUAGE AND META-MODULE

CROSS-REFERENCE TO RELATED APPLICATIONS

This application claims the benefit of PPA Ser. No. 60/791,011 filed 2006-04-11 by the present inventor, and PPA Ser. No. 60/791,097 filed 2006-04-11 by the present inventor, the disclosure of which is incorporated herein by reference.

BACKGROUND OF THE INVENTION

This invention relates particularly to the specification of modules for object-oriented programming, and generally to software development tools generating object-oriented programming language code.

Object-oriented programming enjoys great popularity among programmers. However, in the development of a complex system, the programmer must attend to a vast collection of details. These details may easily obscure and complicate large-scale considerations of the interactions within and between program elements. Hence it would be beneficial to have the use of tools which reduce complexity by automatically handling various details, which may then be suppressed in favor of concise expressions of large-scale interactions.

Object-oriented programming tends to focus on classes, since classes are the most important component in object-oriented programming languages. In many applications, however, significant benefits may be gained by considering modules, which include collections of interrelated classes. Modules typically incorporate classes which are closely related to domain-specific categories. Relationships of generalizations and specialization among domain categories may be reflected in derivation relationships between categorical classes. It would be beneficial for modules to also include non-categorical classes which are specialized for hosting and processing data structures composed of instances from the categorical classes. It would also be beneficial to coordinate and systematize categorical and unitary non-categorical classes to enhance developer productivity, further relieving the developer from excessive attention to tedious details.

The problems of specifying suitable representations have led to enormous efforts in the provision of modeling languages, of which the most prominent may be the Unified Modeling Language (UML). UML is vast and comprehensive, with a scope that encompasses all aspects of object-oriented programming. The breadth of that scope limits the use of idioms, patterns, and other paradigms that are applicable in a narrower context of specific unitary and categorical classes. It would be beneficial to have methods of processing that were specifically directed to the narrower but still critical problems of the specification, construction, and processing of domain-specific object-oriented data structures.

A much-touted feature of UML is its graphical basis. Although graphical diagrams are cherished by some developers, others have found graphical representations of module specifications unintuitive, bulky, clumsy to edit, and inconvenient for automatic processing. Therefore it would be beneficial to have non-graphical means of module specification, especially if such means were intuitive, concise, easy to edit, and convenient for automatic processing.

SUMMARY

A language for the specification of object-oriented modules is disclosed. The language permits human-readable expression of module specifications. A module specification includes a module identifier and a module content specification. The module content specification includes at least one specification selected from the group consisting of a class specification and a host members specification.

The class specification includes a class identifier, a class open terminal, a class content specification, and a class close terminal. The class content specification optionally includes one or more specifications selected from the group consisting of the class specification and a class members specification.

The host members specification and the class members specification each include a type specification, a member specification, optional additional member specifications, and a members terminator terminal. The member specification is selected from the group consisting of a datum specification and a method specification. The datum specification includes a datum identifier. The method specification includes a method identifier and an arguments specification. The arguments specification includes an arguments open terminal, optional argument specifications, and an arguments close terminal. The argument specification, if any, includes the type specification and an optional argument identifier.

The type specification is selected from the group consisting of a void type specification, a value type specification, a reference type specification, and a compound type specification. The reference type specification includes the class identifier. The compound type specification is selected from the group consisting of a reference sequence type specification, a value sequence type specification, a reference set type specification, a value set type specification, a index map type specification, a convert map type specification, a bind map type specification, and a scale map type specification.

The module specification optionally includes a module predicates specification. The module content specification optionally includes a module content predicates specification. The class specification optionally includes a class predicates specification. The class content specification optionally includes a class content predicates specification. The datum specification optionally includes a datum predicates specification. The method specification optionally includes a method predicates specification. The argument specification optionally includes an argument predicates specification.

The module predicates specification, the module content predicates specification, the class predicates specification, the class content predicates specification, the datum predicates specification, the method predicates specification, and the argument predicates specification, if any, each includes a predicate open terminal, a predicate specification, a predicate close terminal, and, optionally, additional predicate specifications. The predicate specifications are selected from the group consisting of a qualifier specification, a singleton specification, and a plurality specification. The qualifier specification includes a qualifier terminal. The singleton specification includes a singleton terminal and an object expression. The object expression is selected from the group consisting of an identifier and a quote. The plurality specification includes a plurality terminal and at least one object expression.

BRIEF DESCRIPTION OF DRAWINGS

FIG. 1 depicts a generator which reads module specifications and writes programming language code and documentation corresponding to the specifications.

FIG. 2 begins the depiction of a summary specification of an exemplary object-oriented module suitable for representation of specifications of object-oriented modules (1/2).

FIG. 3 concludes the depiction of a summary specification of an exemplary object-oriented module suitable for representation of specifications of object-oriented modules (2/2).

FIG. 4 depicts an informal definition of an exemplary class representing a unitary host element for representation of specifications of object-oriented modules.

FIG. 5 depicts an informal definition of an exemplary class representing element elements.

FIG. 6 depicts an informal definition of an exemplary class representing entity elements.

FIG. 7 depicts an informal definition of an exemplary class representing module elements.

FIG. 8 depicts an informal definition of an exemplary class representing class elements.

FIG. 9 depicts an informal definition of an exemplary class representing host-class elements.

FIG. 10 depicts an informal definition of an exemplary class representing operand elements.

FIG. 11 depicts an informal definition of an exemplary class representing argument elements.

FIG. 12 depicts an informal definition of an exemplary class representing member elements.

FIG. 13 depicts an informal definition of an exemplary class representing member-function elements.

FIG. 14 depicts an informal definition of an exemplary class representing member-datum elements.

FIG. 15 depicts an informal definition of an exemplary class representing type elements.

FIG. 16 depicts an informal definition of an exemplary class representing void-type elements.

FIG. 17 depicts an informal definition of an exemplary class representing value-type elements.

FIG. 18 depicts an informal definition of an exemplary class representing bit-type elements.

FIG. 19 depicts an informal definition of an exemplary class representing integer-type elements.

FIG. 20 depicts an informal definition of an exemplary class representing cardinal-type elements.

FIG. 21 depicts an informal definition of an exemplary class representing text-type elements.

FIG. 22 depicts an informal definition of an exemplary class representing reference-type elements.

FIG. 23 depicts an informal definition of an exemplary class representing compound-type elements.

FIG. 24 depicts an informal definition of an exemplary class representing sequence-type elements.

FIG. 25 depicts an informal definition of an exemplary class representing value-sequence-type elements.

FIG. 26 depicts an informal definition of an exemplary class representing reference-sequence -type elements.

FIG. 27 depicts an informal definition of an exemplary class representing set-type elements.

FIG. 28 depicts an informal definition of an exemplary class representing value-set-type elements.

FIG. 29 depicts an informal definition of an exemplary class representing reference-set-type elements.

FIG. 30 depicts an informal definition of an exemplary class representing map-type elements.

FIG. 31 depicts an informal definition of an exemplary class representing index-map-type elements.

FIG. 32 depicts an informal definition of an exemplary class representing scale-map-type elements.

FIG. 33 depicts an informal definition of an exemplary class representing bind-map-type elements.

FIG. 34 depicts an informal definition of an exemplary class representing convert-map-type elements.

FIG. 35 depicts an informal definition of an exemplary class representing logger elements.

FIG. 36 depicts exemplary lexical detectors for the initial state of a lexical analyzer for a language for module specification.

FIG. 37 depicts exemplary predicate relations of a lexical analyzer for a language for module specification.

FIG. 38 depicts additional exemplary predicate relations of a lexical analyzer for a language for module specification.

FIG. 39 depicts exemplary lexical detectors for the double-quote state of a lexical analyzer for a language for module specification.

FIG. 40 depicts exemplary lexical detectors for the single-quote state of a lexical analyzer for a language for module specification.

FIG. 41 depicts exemplary lexical detectors for the multi-quote state of a lexical analyzer for a language for module specification.

FIG. 42 depicts exemplary grammar rules for a language for module specification.

FIG. 43 depicts additional exemplary grammar rules for a language for module specification.

FIG. 44 depicts additional exemplary grammar rules for a language for module specification.

FIG. 45 depicts additional exemplary grammar rules for a language for module specification.

FIG. 46 depicts additional exemplary grammar rules for a language for module specification.

FIG. 47 depicts an exemplary module specification for an object-oriented module suitable for representation of media files in a file system.

DETAILED DESCRIPTION

1 Terminology

The present invention concerns the specification of object-oriented modules. An object-oriented module, or, more simply, a module, is defined as a collection of interrelated object-oriented classes. Specification is a human-oriented activity by which the characteristics of a module may be conveniently expressed. This invention uses textual expressions for specification of modules. Textual expression are easily prepared. When such expressions are consistent with a formal grammar, they are also easily processed to construct object-oriented data structures, which are convenient to produce module definitions and other useful products.

The interrelated classes in a module may be usefully divided into categorical classes and unitary classes. A categorical class corresponds to a category in a domain-specific model. Thus categorical classes are largely determined by the requirements of the domain to which applications of the specified module are directed. Instances of a categorical class are typically unbounded in number. Categorical classes are usually arranged in a hierarchy or a directed acyclic graph, reflecting the relations of genera and species among the domain-specific categories.

Unitary classes relate to the module as a whole. A host is one important unitary class. The host for a module provides a unitary representation of what is typically a multiplicity of objects. The objects are instances of the categorical classes. The host provides access to individual and collected instances according to an organizational scheme which reflects the requirements of the domain. Together with the categorical instances, the host provides a domain-specific object-oriented data structure which is convenient as a target for construction and as a source for processing.

The categorical classes of a module, corresponding to the categories of a domain, are characterized by members, including both data and functions. The form of the member data is specified in the class but each instance has its own copy of member data elements. Member data is characterized by its type. Type is a complex property of data in many object-oriented programming languages. In the present invention, a simplified type system is used, permitting concise specification and enforcing consistency of usage. Types include value types, reference types, and compound types.

Value types correspond to scalar data, in which the value of the data accords with the meaning of the data. Scalar data is typically represented by built-in types of a programming language (e.g. int, float, char, in the C language) or by simple classes (e.g. string, date) which may be passed by value (copying elements or structures). Scalar data is used to represent properties of instances, such as identifiers and measured quantities.

Reference types correspond to references to instances of categories. Reference data is typically represented by pointers or references in a programming language. The value of a pointer is arbitrary and bears no relation to the meaning of the object the pointer represents. Reference data is typically passed by reference (i.e. by copying pointers, not structures). Reference data is used to implement associations among categories in which a first instance is associated with a second instance.

Compound types correspond to collections. Provision of collections varies widely in programming languages. However, for effective application programming, set, sequence, and map may be sufficient. A set is an unordered collection of elements which does not contain duplicates. A set provides efficient determination of the presence or absence of an element. A set also provide efficient insertion and deletion of an elements. Efficient iteration of the constituent elements of a set is another requirement. Efficient in this context means logarithmic in the number of contained elements for determination, insertion and deletion. Sets may contain reference or value data.

A sequence is an ordered collection which provides efficient insertion and deletion of elements at either end of the sequence, thus permitting stack, queue, and dequeue functionality. A sequence may also provide efficient random access to individual elements by offset in the collection order. A sequence also provides efficient iteration of the elements in order. Sequences may contain reference or value data.

A map provides efficient association between domain and range elements. Given a domain element, a map efficiently produces a corresponding range element or indicates the absence of such an element. Maps must efficiently support insertion and deletion of domain, range pairs. Maps support all combinations of range and domain value and reference. An index denotes a map with a value domain and a reference range. A scale denotes a map with a reference domain and a value range. A binding denotes a map with reference domain and range. A conversion denotes a map with value domain and range.

Module definition requires specification of members and class relationships, but other useful information may also be present in module specifications. To permit specification of wide-ranging supplemental information on modules, classes, and members, a system of predicates is incorporated into the specification language. Predicates in general consist of a relation and, optionally, one or more objects. The context in which a predicate is expressed determines the subject to which the predicate applies. Predicates are classified as qualifier, singleton, or plurality predicates according to the variety of their objects. A qualifier does not accept any objects. A singleton accepts exactly one object. A plurality accepts one or more objects.

To permit construction of object-oriented data structures from textual expressions without undue difficulty, a formal grammar may be used to precisely characterize the permissible textual expressions. The use of formal grammars to process textual expressions is well known in the art; the relevant practice is designated syntax-directed translation. Excellent tools are available to facilitate the development of parsers which process textual expressions to generate computational operations in a systematic fashion. For the present invention, the tools utilized include flex, a lexical scanner generator, and bison, a generator providing a parser suitable for syntax-directed translation. Flex and bison are open-source tools which are readily available and in wide use.

Although syntax-directed translation is well known in the art, a quick review of the terminology is provided. A grammar consists of a collection of rules. Each rule relates a nonterminal token to a sequence (possibly empty) of terminal and nonterminal tokens. The tokens may be associated with data elements. Most convenient for the present invention is to associate tokens with instances of object-oriented classes. Terminal tokens are identified by lexical analysis of the textual expression which is being processed. Nonterminal tokens typically represent partially or fully constructed instances of domain-specific classes, or elements that are predecessors to such instances. Rules may be associated with processing steps, often facilitating the construction of the object-oriented data structure which is the product of parsing. The parsing proceeds by application of the rules; each application of a rule, denoted a production or reduction, may be usefully considered as an event, the specific aspects of which are characterized by the data elements associated with the rule tokens at the time of the rule application.

2 System Overview

Refer to FIG. 1. A generator 1000 processes module specifications compatible with a grammar 1002 to produce generated-code 1004 and generated-documents 1006. The specifications are processed by a parser 1008, which constructs an object-oriented data structure encapsulated in a host 1010. The host 1010 represents the specified modules as an object-oriented data structure. The constituent module specifications of the host 1010 are processed by a code-generator 1012 to provide the generated-code 1004. The generated code includes software components written in a conventional object-oriented programming language. The constituent module specifications of the host 1010 are also processed by a document-generator 1014 to provide the generated-documents 1006. The generated documentation includes descriptions and figures which characterize the specified modules.

The present invention is directed to the expression of module specifications using the language of the grammar 1002, and to the processing of module specifications by the parser 1008 to produce an object-oriented data structure encapsulated by the host 1010. Co-pending applications relate to the processing of the host 1010 to produce the generated-code 1004 and the generated-documents 1006.

3 Module Specification Language Overview.

An exemplary language for the specification of object-oriented modules is characterized by the grammar 1002. The grammar 1002 is realized by a parser 1008. The parser 1008 includes lexical analysis to detect terminal tokens. The parser 1008 further includes syntax analysis in which terminal and nonterminal tokens are processed according to rules. Some tokens are associated with instances of classes specified by a meta-module; several classes specific to the processing requirements of the parser are also provided for association with tokens. The detection of lexical terminal tokens and the activation of syntax rules is associated with the actions of the parser. The parser operates on an instance of the meta-module host, assembling a data structure. The elements of the data structure are instances of the classes defined by the meta-module, including a module class, a host class, a class class, a datum class, a method class, and a type class. Certain attributes of the meta-module instances are specified through a predicate mechanism.

The grammar 1002 accepts expressions consisting of interspersed module specifications and class-scope specifications. A module specification corresponds to an instance of the module class and, optionally, an instance of the host class. A module specification includes an identifier, optional predicates, and a curly-bracket delimited module body. A class-scope specification corresponds to an instance of the class class. A class-scope specification includes a module identifier, a scope terminal, a class identifier, and a curly-bracket delimited class body.

Within the module body, classes, members, and predicates may be specified. A class specification corresponds to an instance of the class class. A class specification includes an identifier, optional predicates, and a curly-bracket delimited class body. A member specification corresponds to an instance of the member class. A member specification includes a type, specification of one or more datum or methods, separated by commas, and a closing semicolon. A datum specification corresponds to an instance of the datum class. A datum specification includes an identifier and optional predicates. A method specification corresponds to an instance of the method class. A method specification includes an identifier, an argument list delimited by parentheses, and optional predicates. An argument list consists of zero or more argument specifications, separated by commas. An argument specification corresponds to an instance of the argument class. An argument includes a type, an optional identifier, and optional predicates.

Members specified in a module body are accumulated to an instance of the host class, if any. Likewise, predicates in a module body are accumulated to an instance of the host class. Classes specified in a module body are considered root classes; by default these classes do not have any genera.

Within a class body, classes, members, and predicates may be specified. The specifications of classes, members, and predicates in a class body are syntactically equivalent to respective specifications in a module body. However, classes specified in a class body are defined as species of the containing class. Members and predicates specified in a class body are associated with the containing class.

A type specification corresponds to an instance of the type class. Types are specified as void, value, reference, or compound types. Value types include bit, integer, cardinal, and text. Reference types refer to instances of module classes. Compound types define collections, including set, sequence, and map. Compound types include specification of the type of the collected elements.

Predicates are delimited by square brackets, defining a predicate scope. A predicate scope may specify one or more predicates. Each specified predicate includes a textual relation (corresponding to a keyword) and, optionally, one or more textual objects. Predicates are separated by semicolons. Objects are separated by commas. Predicates are further specialized to qualifiers, singletons, and pluralities. Qualifiers do not accept any objects. Singletons accept a single object. Pluralities accept multiple objects. Individual predicates are processed to instances of specializations of the predicator class; predicators are ultimately processed to perform editorial operations on instances of specializations of the entity class.

4 Meta-Module Description

Refer to FIG. 2. A discursive-model meta-module 1016 specifies classes for representation and processing of modules for object-oriented programming. The meta-module 1016 has a host class host 1018.

The host 1018 represents an instantiation of the module. A datum modules 1020 collects module specifications. A datum types 1022 collects types defined amongst modules for memory management.

A categorical class element 1024 defines a common base for parsed elements.

A categorical class entity 1026 represents named elements. The entity 1026 has genus element 1024.

A categorical class module 1028 represents a collection of interrelated classes for object-oriented programming. The module 1028 has genus entity 1026. A datum classes 1030 represents the collection of classes within a module. A datum forward-classes 1032 represents related classes which are used within a particular module but are not defined in the module. A datum host 1034 represents a class, an instance of which encapsulates an application-specific object-oriented data structure corresponding to an instantiation of a module.

A categorical class class 1036 represents a class for object-oriented programming. The class 1036 has genus entity 1026. A datum members 1038 represents the members of a particular class.

A categorical class host-class 1040 represents an instantiation of a module. The host-class 1040 has genus class 1036.

A categorical class operand 1042 represents a typed entity in a scope. The operand 1042 has genus entity 1026.

A categorical class argument 1044 represents an argument to a member function. The argument 1044 has genus operand 1042.

A categorical class member 1046 represents a member in a class. The member 1046 has genus operand 1042.

A categorical class member-function 1048 represents a member function in a class. The member-function 1048 has genus member 1046. A datum arguments 1050 specifies the arguments to a member function.

A categorical class member-datum 1052 represents a member datum in a class. The member-datum 1052 has genus member 1046.

Refer to FIG. 3. A categorical class type 1054 characterizes the typing of an operand. The type 1054 has genus element 1024.

A categorical class void-type 1056 characterizes the absence of a type. The void-type 1056 has genus type 1054.

A categorical class value-type 1058 characterizes a type which is passed by value. The value-type 1058 has genus type 1054.

A categorical class bit-type 1060 represents a Boolean value, true or false. The bit-type 1060 has genus value-type 1058.

A categorical class integer-type 1062 represents an integral value. The integer-type 1062 has genus value-type 1058.

A categorical class cardinal-type 1064 represents a non-negative integral value. The cardinal-type 1064 has genus value-type 1058.

A categorical class text-type 1066 represents a textual value. The text-type 1066 has genus value-type 1058.

A categorical class reference-type 1068 characterizes a type which is passed by reference. The reference-type 1068 has genus type 1054.

A categorical class compound-type 1070 characterizes a type which corresponds to a collection. The compound-type 1070 has genus type 1054.

A categorical class sequence-type 1072 characterizes a sequence of elements. The sequence-type 1072 has genus compound-type 1070.

A categorical class value-sequence-type 1074 characterizes a sequence of value-typed elements. The value-sequence-type 1074 has genus sequence-type 1072.

A categorical class reference-sequence-type 1076 characterizes a sequence of reference-typed elements. The reference-sequence-type 1076 has genus sequence-type 1072.

A categorical class set-type 1078 characterizes a set of elements. The set-type 1078 has genus compound-type 1070.

A categorical class value-set-type 1080 characterizes a set of value-typed elements. The value-set-type 1080 has genus set-type 1078.

A categorical class reference-set-type 1082 characterizes a set of reference-typed elements. The reference-set-type 1082 has genus set-type 1078.

A categorical class map-type 1084 characterizes a map associating pairs of elements. The map-type 1084 has genus compound-type 1070.

A categorical class index-map-type 1086 characterizes a map, of which the range elements are of reference type and the domain elements are of value type. The index-map-type 1086 has genus map-type 1084.

A categorical class scale-map-type 1088 characterizes a map, of which the range elements are of value type and the domain elements are of reference type. The scale-map-type 1088 has genus map-type 1084.

A categorical class bind-map-type 1090 characterizes a map, of which both the range and domain elements are of reference type. The bind-map-type 1090 has genus map-type 1084.

A categorical class convert-map-type 1092 characterizes a map, of which both the range and domain elements are of value type. The convert-map-type 1092 has genus map-type 1084.

A categorical class logger 1094 provides logging services.

4.1 Host Class

Refer to FIG. 4. The host 1018 represents an instantiation of the module. The modules 1020 collects module specifications. The modules 1020 ranges over instances of the class module 1028. The modules 1020 is a meron. A method module 1096 maps module identifiers to module specifications. A datum module-index 1098 maps module identifiers to module specifications. The module-index 1098 ranges over instances of the class module 1028. A method accept-module 1100 accepts a module specification. The types 1022 collects types defined amongst modules for memory management. The types 1022 ranges over instances of the class type 1054. The types 1022 is a meron. A method accept-type 1102 accepts a supplied type instance for accumulation in types 1022. The accept-type 1102 always accepts the supplied type.

4.2 Element Categorical Class

Refer to FIG. 5. The element 1024 defines a common base for parsed elements. The element 1024 is a root-level class of the meta-module 1016. A datum source 1104 identifies the source file and line from which the element was parsed. The source 1104 is useful for reporting errors. The source 1104 ranges over scalar text.

4.3 Entity Categorical Class

Refer to FIG. 6. The entity 1026 represents named elements. The entity 1026 has genus element 1024. A datum id 1106 uniquely identifies a particular entity in a global scope. The id 1106 is required. The id 1106 ranges over scalar text.

A datum term 1108 provides a text-friendly identifier, not necessarily unique. The term 1108 is used in the generated particulars of an entity. The term 1108 is required. The term 1108 ranges over scalar text. A datum title 1110 provides a text-friendly phrase, suitable for heading a section or figure. The title 1110 ranges over scalar text. The title 1110 is currently ignored except for module and class. A datum purpose 1112 describes the purpose of a particular entity. The purpose 1112 should be a predicate corresponding to the entity as a subject. The purpose 1112 ranges over scalar text. A datum passage 1114 indicates the segment in which to present a particular entity. The passage 1114 ranges over scalar text. The passage 1114 should be restricted to the class 1036 and the module 1028. A datum remarks 1116 provides primary supplemental descriptive information pertaining to a particular entity. The remarks 1116 should be a predicate corresponding to the entity as a subject. The remarks 1116 are presented at the beginning of the generated particulars of a particular entity. The remarks 1116 ranges over scalar text. A datum notes 1118 provides secondary supplemental descriptive information pertaining to a particular entity. The notes 1118 should be a predicate corresponding to the entity as a subject. The notes 1118 are presented at the end of the generated particulars of a particular entity. The notes 1118 ranges over scalar text.

4.4 Module Categorical Class

Refer to FIG. 7. The module 1028 represents a collection of interrelated classes for object-oriented programming. The module 1028 has genus entity 1026. The classes 1030 represents the collection of classes within a module. The classes 1030 ranges over instances of the class class 1036. The classes 1030 is a meron. A datum class-index 1120 associates a particular class 1036 with its unique id 1106. The class-index 1120 ranges over instances of the class class 1036. A method accept-class 1122 accepts an instance of the class 1036 as a constituent of a module. The accept-class 1122 updates the classes 1030 and the class-index 1120. The accept-class 1122 fails on duplicate id 1106. A method resolve-class 1124 resolves a textual identifier to an instance of the class 1036 which is a constituent of a module. The resolve-class 1124 uses the class-index 1120. A method sort-classes 1126 performs topological sort of module classes to ensure that no class is defined before its genera. The forward-classes 1032 represents related classes which are used within a particular module but are not defined in the module. The forward-classes 1032 ranges over instances of the class class 1036. The forward-classes 1032 is a meron. A method accept-forward-class 1128 accepts an instance of the class 1036 as a forward class definition. The accept-forward-class 1128 updates the forward-classes 1130 and the class-index 1120. The accept-forward-class 1128 assumes memory management of the supplied class. A datum root-classes 1132 represents the collection of classes with a module which do not have any generalizations within the module. The root-classes 1132 is a subset of the classes 1030. The root-classes 1132 ranges over instances of the class class 1036. The host 1034 represents a class, an instance of which encapsulates an application-specific object-oriented data structure corresponding to an instantiation of a module. The host 1034 is the target for module-scoped member specifications. The host 1034 instance may be denoted as a model object or a document object. The host 1034 may contain resolver, depository, factory, reflector, etc. according to specification. The host 1034 ranges over instances of the class host-class 1040. The host 1034 is a meron. A method accept-host 1134 accepts an instance of the host-class 1040 for assignment to the host 1034. The accept-host 1134 fails if the host class instance is already defined. A datum viewer-id 1136 specifies a view operator to be generated; the generated viewer provides a useful base class for read-only operators that process an instantiation of a module. The viewer-id 1136 ranges over scalar text. A datum editor-id 1138 specifies an edit operator to be generated; the generated editor provides a useful base class for write-capable operators that process an instantiation of a module. The editor-id 1138 ranges over scalar text. A datum factory-id 1140 specifies a factory operator to be generated; the generated factory provides text-driven instantiation of objects from the classes of a module. The factory-id 1140 is particularly useful for processing markup. The factory-id 1140 ranges over scalar text. A datum factory-root-id 1142 specifies the base class from which factory-generated classes must derive; cf. the factory-id 1140. The factory-root-id 1142 ranges over scalar text. A datum auditor-id 1144 specifies an auditor operator to be generated; the generated auditor determines conformance with specified requirements. The auditor-id 1144 ranges over scalar text. A datum reflector-id 1146 specifies a reflector operator to be generated; the generated reflector provides a run-time representation of the specialization and generalization relationships of the classes of a module. The reflector-id 1146 ranges over scalar text. A datum parser-id 1148 specifies an external parser class, for which lexical responders shall be generated to facilitate generic processing of assignments from predicates. The parser-id 1148 ranges over scalar text. A datum resolver-id 1150 specifies a resolver operator to be generated; the generated resolver provides resolution of identifiers to instances. The resolver-id 1150 uses the member specified by the resolver-id-field 1152 of the class specified by the resolver-root-id 1154. The resolver-id 1150 resolves identifiers to instances of the class specified by the resolver-root-id 1154. The resolver-id 1150 ranges over scalar text. The resolver-id 1150 specializes the editor operator specified by the editor-id 1138. A datum resolver-root-id 1154 specifies the common base class for resolution. The resolver-root-id 1154 must have a member datum or function corresponding to the resolver-id-field 1152. The resolver-root-id 1154 ranges over scalar text. A datum resolver-id-field 1152 specifies the member of the class specified by the resolver-root-id 1154 which uniquely identifies instances of the class specified by the resolver-root-id 1154. The resolver-id-field 1152 is used by the generated resolver. The resolver-id-field 1152 must be a member datum or member function of the class specified by the resolver-root-id 1154. The resolver-id-field 1152 ranges over scalar text. A datum acceptor-id 1156 specifies an acceptor class to be generated; the generated acceptor serves as a genus class for specific acceptor classes, also to be generated. The acceptor-id 1156 is particularly useful for parsing and processing markup. The acceptor-id 1156 ranges over scalar text. A datum predicator-id 1158 specifies a predicator class to be generated; the generated predicator serves as a genus class for specific predicator classes, also to be generated. The predicator-id 1158 is particularly useful for parsing and processing markup. The predicator-id 1158 ranges over scalar text. A method qualifier-id 1160 specifies a qualifier class, specializing the predicator, to be generated. A method singleton-id 1162 specifies a singleton class, specializing the predicator, to be generated. A method plurality-id 1164 specifies a plurality class, specializing the predicator, to be generated. A method predicator-sequence-id 1166 specifies a class providing a sequence of predicators, to be generated. A method promissory-reference-id 1168 specifies a class providing a deferred resolution of a textual reference. A method depository-id 1170 specifies a depository class, holding promissory references for eventual redemption. A datum predicator-host-id 1172 specifies a predicator host class to be generated; the generated predicator host serves predicators corresponding to predicates. The predicator-host-id 1172 is particularly useful for processing markup. The predicator-host-id 1172 ranges over scalar text.

4.5 Class Categorical Class

Refer to FIG. 8. The class 1036 represents a class for object-oriented programming. The class 1036 has genus entity 1026. A datum module 1174 represents a particular instance of the module 1028 of which a particular class is a constituent. The module 1174 is complementary to the classes 1030. The module 1174 ranges over instances of the class module 1028. A datum genera 1176 represents the collection of classes from which a particular class is derived. The genera 1176 includes the closest generalizations of a particular class. The genera 1176 ranges over instances of the class class 1036. The members 1038 represents the members of a particular class. The members 1038 may include data members and function members. The members 1038 ranges over instances of the class member 1046. The members 1038 is a meron. A datum member-index 1178 associates members with their scoped identifiers. The member-index 1178 ranges over instances of the class member 1046. A datum species 1180 represents the collection of classes which are derived from a particular class. The species 1180 are the closest specializations of a particular class. The species 1180 are useful for depth-first processing of classes in a module; cf. the root-classes 1132. The species 1180 is complementary to the genera 1176. The species 1180 ranges over instances of the class class 1036. A datum genera-closure 1182 represents the totality of classes in the ancestry of a class. The genera-closure 1182 includes all the generalizations of a particular class. The genera-closure 1182 ranges over instances of the class class 1036. A datum species-closure 1184 represents the totality of classes descending from a class. The species-closure 1184 includes all the specializations of a particular class. The species-closure 1184 is complementary to the genera-closure 1182. The species-closure 1184 ranges over instances of the class class 1036. A datum is-module-root 1186 indicates whether a particular class lacks any generalizations in its containing module 1028. The is-module-root 1186 corresponds to membership in the root-classes 1132. The is-module-root 1186 ranges over scalar boolean. A datum constructs-markup-element 1188 indicates responsiveness to element construction in processing markup. The constructs-markup-element 1188 is applicable to the host only. The constructs-markup-element 1188 ranges over scalar boolean. A datum accepts-markup-element 1190 indicates responsiveness to elements in processing markup. The accepts-markup-element 1190 ranges over scalar boolean. A datum accepts-markup-text 1192 indicates responsiveness to text in processing markup. The accepts-markup-text 1192 ranges over scalar boolean. A datum accepts-markup-predicate 1194 indicates responsiveness to predicates in processing markup. The accepts-markup-predicate 1194 ranges over scalar boolean. A datum markup-configure 1196 indicates responsiveness to element configuration in processing markup. The markup-configure 1196 ranges over scalar boolean. A datum markup-commit 1198 indicates responsiveness to element commitment in processing markup. The markup-commit 1198 ranges over scalar boolean. A datum is-pure-abstract 1200 indicates whether class is not instantiable due to pure member functions. The is-pure-abstract 1200 is computed at module instantiation; do not set. The is-pure-abstract 1200 ranges over scalar boolean. A method accept-member 1202 accumulates a member. The accept-member 1202 updates the members 1038 and the member-index 1178. The accept-member 1202 fails on duplicate scoped identifiers for members. A datum provides-downcast 1204 specifies the provision of a safe downcast to immediate species of a class. The provides-downcast 1204 is occasionally useful but easily abused; beware. The provides-downcast 1204 ranges over scalar boolean. A datum tags 1206 indicates generic textual identifiers usable for instantiation of a particular class. The tags 1206 are especially useful for parsing text and processing markup. The tags 1206 ranges over scalar text. A method acceptor-host-id 1208 specifies a class which maps tags to acceptors. A datum audit-requirements 1210 specifies boolean conditions that may be verified by a generated auditor as specified by the auditor-id 1212. The audit-requirements 1210 ranges over scalar text. A datum auditor-context 1214 supplies reporting context for auditor. The auditor-context 1214 must evaluate to an instance of text. The auditor-context 1214 ranges over scalar text.

4.6 Host Class Categorical Class

Refer to FIG. 9. The host-class 1040 represents an instantiation of a module. The host-class 1040 represents the totality of an application-specific object-oriented data structure. The host-class 1040 corresponds to the host 1034. The host-class 1040 typically occurs in a singleton instance per application. The host-class 1040 provides a useful target for parsing, markup, etc. The host-class 1040 has genus class 1036.

4.7 Operand Categorical Class

Refer to FIG. 10. The operand 1042 represents a typed entity in a scope. The operand 1042 has genus entity 1026. A datum scope-handle 1216 informally identifies an operand in a scope. The scope-handle 1216 ranges over scalar text. A method validate-handle 1218 ensures that a proposed handle does not conflict with C++ reserved words. A method accept-scope-handle 1220 provides an acceptor for the scope-handle 1216. A datum scope-id 1222 uniquely identifies an operand in a scope. The scope-id 1222 is applicable to members in a class scope and arguments in a member function scope. The scope-id 1222 ranges over scalar text. A datum is-const 1224 indicates whether the operand may be modified in the scope. The is-const 1224 ranges over scalar boolean. A datum type 1226 specifies the type of an operand. The type 1226 ranges over instances of the class type 1054.

4.8 Argument Categorical Class

Refer to FIG. 11. The argument 1044 represents an argument to a member function. The argument 1044 has genus operand 1042. A datum position 1228 indicates the position of the argument in the member function argument sequence. The position 1228 ranges over scalar cardinal. A datum arg-default 1230 indicates a default value for the argument. The arg-default 1230 ranges over scalar text.

4.9 Member Categorical Class

Refer to FIG. 12. The member 1046 represents a member in a class. The member 1046 has genus operand 1042. A datum member-class 1232 identifies the class which specifies the member. The member-class 1232 ranges over instances of the class class 1036.

4.10 Member Function Categorical Class

Refer to FIG. 13. The member-function 1048 represents a member function in a class. The member-function 1048 has genus member 1046. A datum is-static 1234 indicates a class function. The is-static 1234 is invoked independently of any instance of the class. The is-static 1234 ranges over scalar boolean. A datum is-virtual 1236 indicates a virtual member function. The is-virtual 1236 ranges over scalar boolean. A datum is-pure 1238 indicates a pure virtual member function. The is-pure 1238 implies is-virtual 1236, but not vice versa. The is-pure 1238 precludes instantiation of the containing class when set. The is-pure 1238 ranges over scalar boolean. The arguments 1050 specifies the arguments to a member function. The arguments 1050 ranges over instances of the class argument 1044. The arguments 1050 is a meron. A datum inline-definition 1240 specifies the inline definition of a member function. The inline-definition 1240 ranges over scalar text. A datum definition 1242 specifies the definition of a member function. The definition 1242 precludes the inline definition of a member function. The definition 1242 ranges over scalar text. A datum indicates 1244 describes the meaning of the return value of a member function. The indicates 1244 should be a complement to "The member returns a [type], indicating . . . ". The indicates 1244 ranges over scalar text.

4.11 Member Datum Categorical Class

Refer to FIG. 14. The member-datum 1052 represents a member datum in a class. The member-datum 1052 has genus member 1046. A datum is-meron 1246 indicates that a member datum is a meronym of the containing instance of the class to which it belongs. The is-meron 1246 indicates that the member datum is to be deleted on deletion of the containing instance. The is-meron 1246 indicates that, by default, viewers and editors of the module should recursively visit the member datum when visiting the containing instance. The is-meron 1246 ranges over scalar boolean. A datum is-mutable 1248 indicates that non-const access to a member datum is provided even when the containing instance is const. The is-mutable 1248 ranges over scalar boolean. A datum init 1250 indicates an initial value for the datum at instantiation. The init 1250 ranges over scalar text. A method predicator-class-id 1252 specifies an identifier for a predicator class which will mediate transformation from a textual representation to a type-safe object-oriented element. The predicator-class-id 1252 identifies a class which is applicable for direct processing of scalars and meron references in predicates and attributes; a promissory reference is used to process non-meron references. A method promissory-class-id 1254 specifies an identifier for a promissory class which will mediate deferred transformation from a textual reference to a type-safe object-oriented element. The promissory-class-id 1254 identifies a class which is applicable for processing non-meron references in predicates and attributes. A method acceptor-class-id 1256 specifies an identifier for an acceptor class which will receive and assign instances. The acceptor-class-id 1256 identifies a class which is applicable for processing contained markup elements. A method generic-acceptor-id 1258 specifies an identifier for a member function which provides a uniform acceptance interface (assignment or accumulation) for elements of the proper type. The generic-acceptor-id 1258 identifies a member function which is required by acceptors and predicators. A datum acceptor 1260 specifies a member function to which assignment or accumulation of the datum is restricted. The acceptor 1260 ranges over instances of the class member-function 1048. The acceptor 1260 should indicate a member function which returns a boolean indicating the success of the attempted assignment. A datum inhibit-predicator 1262 prevents automatic generation of a predicator for use in parsing and processing markup. The inhibit-predicator 1262 typically used with an acceptor where the underlying member datum is a secondary target, e.g., an index associated with a sequence. The inhibit-predicator 1262 ranges over scalar boolean. A datum tags 1264 specifies textual identifiers usable for instantiation of a particular class and subsequently for assignment to a particular member. The tags 1264 are especially useful for parsing text and processing markup. The tags 1264 ranges over scalar text. A datum handles 1266 permit scope-specific alternative identification. The handles 1266 must be unique in scope. The handles 1266 are used as identifiers in the generation of convenience member functions. The handles 1266 ranges over scalar text. A method accept-handle 1268 validates and accepts the supplied handle.

4.12 Type Categorical Class

Refer to FIG. 15. The type 1054 characterizes the typing of an operand. The type 1054 has genus element 1024. A method type-text 1270 provides a textual representation of a type. A method is-plural 1272 distinguishes plural from singleton types. The is-plural 1272 is false, by default; non-compound types are singular.

4.13 Void Type Categorical Class

Refer to FIG. 16. The void-type 1056 characterizes the absence of a type. The void-type 1056 has genus type 1054. A method type-text 1274 returns "Void".

4.14 Value Type Categorical Class

Refer to FIG. 17. The value-type 1058 characterizes a type which is passed by value. The value-type 1058 has genus type 1054.

4.15 Bit Type Categorical Class

Refer to FIG. 18. The bit-type 1060 represents a Boolean value, true or false. The bit-type 1060 has genus value-type 1058. A method type-text 1276 returns "Bit".

4.16 Integer Type Categorical Class

Refer to FIG. 19. The integer-type 1062 represents an integral value. The integer-type 1062 has genus value-type 1058. A method type-text 1278 returns "Integer".

4.17 Cardinal Type Categorical Class

Refer to FIG. 20. The cardinal-type 1064 represents a non-negative integral value. The cardinal-type 1064 useful for counting. The cardinal-type 1064 has genus value-type 1058. A method type-text 1280 returns "Cardinal".

4.18 Text Type Categorical Class

Refer to FIG. 21. The text-type 1066 represents a textual value. The text-type 1066 has genus value-type 1058. A method type-text 1282 returns "Text".

4.19 Reference Type Categorical Class

Refer to FIG. 22. The reference-type 1068 characterizes a type which is passed by reference. The reference-type 1068 corresponds to a class. The reference-type 1068 has genus type 1054. A datum reference-class-id 1284 identifies the class to which a reference type corresponds. The reference-class-id 1284 ranges over scalar text. A method type-text 1286 returns the reference-class-id 1284.

4.20 Compound Type Categorical Class

Refer to FIG. 23. The compound-type 1070 characterizes a type which corresponds to a collection. The compound-type 1070 is parameterized by one or more subsidiary types. The compound-type 1070 has genus type 1054. A datum parameters 1288 specifies the subsidiary types by which a compound type is parameterized. The parameters 1288 ranges over instances of the class type 1054. A method type-text 1290 has unspecified purpose. A method compound-text 1292 specifies the particular compound, e.g. sequence, set, etc. A method is-plural 1294 has unspecified purpose. The is-plural 1294 is true, by default; compound types are plural. A datum range 1296 specifies the characteristic subsidiary type of the elements in the compound type. The range 1296 ranges over instances of the class type 1054.

4.21 Sequence Type Categorical Class

Refer to FIG. 24. The sequence-type 1072 characterizes a sequence of elements. The sequence-type 1072 specifies a compound element that permits efficient addition or removal of elements at the front or back of the sequence. The sequence-type 1072 specifies a compound element that permits direct access to elements by position in the sequence. The sequence-type 1072 specifies a compound element that permits iteration of the elements in the sequence. The sequence-type 1072 has genus compound-type 1070. A method compound-text 1298 has unspecified purpose. The compound-text 1298 returns "Sequence".

4.22 Value Sequence Type Categorical Class

Refer to FIG. 25. The value-sequence-type 1074 characterizes a sequence of value-typed elements. The value-sequence-type 1074 has genus sequence-type 1072. A datum value-range 1300 specifies the value type of the sequence elements. The value-range 1300 ranges over instances of the class value-type 1058.

4.23 Reference Sequence Type Categorical Class

Refer to FIG. 26. The reference-sequence-type 1076 characterizes a sequence of reference-typed elements. The reference-sequence-type 1076 has genus sequence-type 1072. A datum reference-range 1302 specifies the reference type of the sequence elements. The reference-range 1302 ranges over instances of the class reference-type 1068.

4.24 Set Type Categorical Class

Refer to FIG. 27. The set-type 1078 characterizes a set of elements. The set-type 1078 specifies a compound element that permits efficient determination of the presence or absence of a particular element in the set. The set-type 1078 specifies a compound element that permits iteration of elements in the set. The set-type 1078 has genus compound-type 1070. A method compound-text 1304 has unspecified purpose. The compound-text 1304 returns "Set".

4.25 Value Set Type Categorical Class

Refer to FIG. 28. The value-set-type 1080 characterizes a set of value-typed elements. The value-set-type 1080 has genus set-type 1078. A datum value-range 1306 specifies the value type of the set elements. The value-range 1306 ranges over instances of the class value-type 1058.

4.26 Reference Set Type Categorical Class

Refer to FIG. 29. The reference-set-type 1082 characterizes a set of reference-typed elements. The reference-set-type 1082 has genus set-type 1078. A datum reference-range 1308 specifies the reference type of the set elements. The reference-range 1308 ranges over instances of the class reference-type 1068.

4.27 Map Type Categorical Class

Refer to FIG. 30. The map-type 1084 characterizes a map associating pairs of elements. The map-type 1084 specifies a compound element that permits association of a range element with a supplied domain element. The map-type 1084 specifies a compound element that permits iteration of pairs. The map-type 1084 has genus compound-type 1070. A datum domain 1310 specifies the subsidiary type of the domain elements. The domain 1310 ranges over instances of the class type 1054. A method compound-text 1312 has unspecified purpose. The compound-text 1312 returns "Map".

4.28 Index Map Type Categorical Class

Refer to FIG. 31. The index-map-type 1086 characterizes a map, of which the range elements are of reference type and the domain elements are of value type. The index-map-type 1086 has genus map-type 1084. A datum value-domain 1314 specifies the value type of the map domain. The value-domain 1314 ranges over instances of the class value-type 1058. A datum reference-range 1316 specifies the reference type of the map range. The reference-range 1316 ranges over instances of the class reference-type 1068.

4.29 Scale Map Type Categorical Class

Refer to FIG. 32. The scale-map-type 1088 characterizes a map, of which the range elements are of value type and the domain elements are of reference type. The scale-map-type 1088 has genus map-type 1084. A datum reference-domain 1318 specifies the reference type of the map domain. The reference-domain 1318 ranges over instances of the class reference-type 1068. A datum value-range 1320 specifies the value type of the map range. The value-range 1320 ranges over instances of the class value-type 1058.

4.30 Bind Map Type Categorical Class

Refer to FIG. 33. The bind-map-type 1090 characterizes a map, of which both the range and domain elements are of reference type. The bind-map-type 1090 has genus map-type 1084. A datum reference-domain 1322 specifies the reference type of the map domain. The reference-domain 1322 ranges over instances of the class reference-type 1068. A datum reference-range 1324 specifies the reference type of the map range. The reference-range 1324 ranges over instances of the class reference-type 1068.

4.31 Convert Map Type Categorical Class

Refer to FIG. 34. The convert-map-type 1092 characterizes a map, of which both the range and domain elements are of value type. The convert-map-type 1092 has genus map-type 1084. A datum value-domain 1326 specifies the value type of the map domain. The value-domain 1326 ranges over instances of the class value-type 1058. A datum value-range 1328 specifies the value type of the map range. The value-range 1328 ranges over instances of the class value-type 1058.

4.32 Logger Categorical Class

Refer to FIG. 35. The logger 1094 provides logging services. The logger 1094 is a root-level class of the meta-module 1016.

5 Module Specification Language 5.1 Parse Classes

The meta-module 1016 includes classes, instances of which may be associated with tokens in the grammar 1002. The class module 1028 represents a collection of interrelated classes. The class class 1036 represents a class for object-oriented programming. The class member 1046 represents a member of an object oriented class, including a member datum and a member function. The class argument 1044 represents an argument to a member function. The class type 1054 represents the type of an operand, where operands include member data, member functions, and arguments to member functions. The class value-type 1058 represents a scalar type, instances of which are typically transferred by copying. The class reference-type 1068 represents a reference type, instances of which are typically transferred by copying a pointer.

The parser 1008 makes use of several parse-specific classes in processing specifications compatible with the grammar 1002. A class parse-members 1330 represents a specified sequence of instances of the member 1046 sharing a common type. A class parse-arguments 1332 represents a sequence of instances of the argument 1044, corresponding to the argument list of a member function. A class parse-identifier 1334 represents alphanumeric text identifying an entity, such as the name of a module, class, member, etc. A class parse-text 1336 represents arbitrary text in the parser, typically an object to a predicate.

The parser 1008 makes wide use of specializations of the class predicator 1338 for use in processing predicates. The predicator 1338 represents an abstract class which is capable of assigning a value (typically specified by a predicate object) to a member of a parse class. A class predicator-qualifier 1340, specializing the predicator 1338, represents an predicator which lacks an object. A class predicator-singleton 1342, specializing the predicator 1338, represents an predicator which operates on a single object. A class predicator-plurality 1344, specializing the predicator 1338, represents an predicator which operates on plural objects. A class predicator-sequence 1346 represents a sequence of instances of the predicator 1338, corresponding to one or more predicates.

5.2 Lexical Analysis

FIG. 36 depicts lexical detectors for a state initial 1348 of the grammar 1002. The initial 1348 corresponds to the initial, default, lexical analysis' state.

FIG. 37 and FIG. 38 depict lexical detectors for predicate relations in the initial 1348. Each predicate relation corresponds to a particular specialization of the predicator 1338.

FIG. 39 depicts lexical detectors for a state double-quote 1350 of the grammar 1002. The double-quote 1350 corresponds to lexical processing inside a double-quoted string.

FIG. 40 depicts lexical detectors for a state single-quote 1352 of the grammar 1002. The single-quote 1352 corresponds to lexical processing inside a single-quoted string.

FIG. 41 depicts lexical detectors for a state multi-quote 1354 of the grammar 1002. The multi-quote 1354 corresponds to lexical processing inside a multi-line quoted string.

5.2.1 Lexical Analysis Initial State

Refer to FIG. 36. The state initial 1348 corresponds to the initial, default, lexical analysis state. The initial 1348 detects comments, punctuation, type primitives, reserved words, and identifiers.

A match 1356 detects shell-style comments, which are ignored in processing a module specification. A match 1358 detects white space, which is ignored. A match 1360 detects a newline. The match 1360 triggers a newline 1362, which maintains an internal line count in the parser 1008. The line count is useful for reporting errors and other status.

A match 1364 detects a scope symbol. The match 1364 returns a scope-terminal 1366. The scope symbol permits a module specification to be distributed over multiple sections (and files). Each section specifies a scope, including a module scope or a class scope.

A match 1368 detects a left curly bracket, opening a module or class scope. The match 1368 returns an open-curly-terminal 1370. The open-curly-terminal 1370 serves as a module open terminal and a class open terminal, depending on context.

A match 1372 detects a right curly bracket, closing a module or class scope. The match 1372 returns a close-curly-terminal 1374. The open-curly-terminal 1370 serves as a module close terminal and a class close terminal, depending on context.

A match 1376 detects a left square bracket, opening a predicate scope. The match 1376 returns an open-square-terminal 1378. The open-square-terminal 1378 serves as a predicates open terminal.

A match 1380 detects a right square bracket, closing a predicate scope. The match 1380 returns a close-square-terminal 1382. The close-square-terminal 1382 serves as a predicates close terminal.

A match 1384 detects a left parenthesis, opening an argument list. The match 1384 returns an open-paren-terminal 1386. The open-paren-terminal 1386 serves as an arguments open terminal.

A match 1388 detects a right parenthesis, closing an argument list. The match 1388 returns a close-paren-terminal 1390. The close-paren-terminal 1390 serves as an arguments close terminal.

A match 1392 detects a left angle bracket, opening a type parameter sequence for a compound type. The match 1392 returns a open-angle-terminal 1394. The open-angle-terminal 1394 serves as a parameters open terminal.

A match 1396 detects a right angle bracket, closing a type parameter sequence for a compound type. The match 1396 returns a close-angle-terminal 1398. The close-angle-terminal 1398 serves as a parameters close terminal.

A match 1400 detects a semicolon, indicating the end of a sequence of member declarations or a predicate separator. The match 1400 returns a semicolon-terminal 1402. The semicolon-terminal 1402 serves as a members terminator terminal.

A match 1404 detects a comma, separating member function arguments or predicate objects. The match 1404 returns a comma-terminal 1406. The comma-terminal 1406 serves as a members separator terminal, as an arguments separator terminal, and as an objects separator terminal, according to context.

A match 1408 detects a double quote, indicating the beginning of double-quoted text. The match 1408 transfers the lexer state to the double-quote 1350. The match 1408 triggers a quote-open 1410, in which the parser 1008 will accumulate quoted text.

A match 1412 detects a single quote, indicating the beginning of single-quoted text. The match 1412 transfers the lexer state to the single-quote 1352. The match 1412 triggers the quote-open 1410, in which the parser 1008 will accumulate quoted text.

A match 1414 detects a multi-quote opening sequence, indicating the beginning of multi-line quoted text. Single and double-quoted text may not extend across line boundaries (following the convention of C and C++). A special multi-line quote is therefore provided to accommodate multi-line quoted text. The match 1414 transfers the lexer state to the multi-quote 1354. The match 1414 triggers the quote-open 1410, in which the parser 1008 will accumulate quoted text, including newlines in the multi-quote 1354.

A match 1416 detects void type keywords. The match 1416 returns a void-terminal 1418. The void-terminal 1418 is associated with an instance of the type 1054. The match 1416 triggers a void-type 1420, which instantiates an instance of the void-type 1056, a specialization of the type 1054.

A match 1422 detects integer type keywords. The match 1422 returns a int-terminal 1424. The int-terminal 1424 is associated with an instance of the value-type 1058. The match 1422 triggers a int-type 1426, which instantiates an instance of the integer-type 1062, a specialization of the value-type 1058.

A match 1428 detects boolean type keywords. The match 1428 returns a bit-terminal 1430. The bit-terminal 1430 is associated with an instance of the value-type 1058. The match 1428 triggers a bit-type 1432, which instantiates an instance of the bit-type 1060, a specialization of the value-type 1058.

A match 1434 detects cardinal type keywords. The match 1434 returns a card-terminal 1436. The card-terminal 1436 is associated with an instance of the value-type 1058. The match 1434 triggers a card-type 1438, which instantiates an instance of the cardinal-type 1064, a specialization of the value-type 1058.

A match 1440 detects text type keywords. The match 1440 returns a text-terminal 1442. The text-terminal 1442 is associated with an instance of the value-type 1058. The match 1440 triggers a text-type 1444 which instantiates an instance of the text-type 1066, a specialization of the value-type 1058.

A match 1446 detects set type keywords. The match 1446 returns a set-terminal 1448.

A match 1450 detects map type keywords. The match 1450 returns a map-terminal 1452.

A match 1454 detects sequence type keywords. The match 1454 returns a seq-terminal 1456.

A match 1458 detects alphanumeric identifiers. The match 1458 returns a id-terminal 1460. The id-terminal 1460 is associated with an instance of the parse-identifier 1334. The match 1458 triggers an id 1462, which instantiates an instance of the parse-identifier 1334 with its constituent text reflecting the detected identifier. The id-terminal 1460 serves as a module identifier, a class identifier, a datum identifier, a method identifier, and an object, according to context.

A match 1464 matches any character. This detector indicates an error (unexpected character). The match 1464 triggers a bad-char 1466, which results in a parse failure.

Refer to FIG. 37. The grammar 1002 includes relations which are associated with lexer keywords. Each relation implies a specialization of the predicator 1338, which is created in the particular lexical responder. Predicate relations participate in qualifier specifications, singleton specifications, and plurality specifications.

A match 1468 detects the reserved word "acceptor," representing a singleton predicate relation. The match 1468 returns a singleton-terminal 1470. The singleton-terminal 1470 is associated with an instance of the predicator-singleton 1342. The match 1468 triggers an acceptor-predicate 1472, which provides an instance of a specialization of the predicator 1338 suitable for assignment to the member datum acceptor 1260 of the class member-datum 1052.

A match 1474 detects the reserved word "acceptor-id," representing a singleton predicate relation. The match 1474 returns the singleton-terminal 1470. The match 1474 triggers an acceptor-id-predicate 1476, which provides an instance of a specialization of the predicator 1338 suitable for assignment to the member datum acceptor-id 1156 of the class module 1028.

A match 1478 detects the reserved word "accept-element," representing a qualifier predicate relation. The match 1478 returns a qualifier-terminal 1480. The qualifier-terminal 1480 is associated with an instance of the predicator-qualifier 1340. The match 1478 triggers an accepts-markup-element-predicate 1482, which provides an instance of a specialization of the predicator 1338 suitable for assignment to the member datum accepts-markup-element 1190 of the class class 1036.

A match 1484 detects the reserved word "accept-predicate," representing a qualifier predicate relation. The match 1484 returns the qualifier-terminal 1480. The match 1484 triggers an accepts-markup-predicate-predicate 1486, which provides an instance of a specialization of the predicator 1338 suitable for assignment to the member datum accepts-markup-predicate 1194 of the class class 1036.

A match 1488 detects the reserved word "accept-text," representing a qualifier predicate relation. The match 1488 returns the qualifier-terminal 1480. The match 1488 triggers an accepts-markup -text-predicate 1490, which provides an instance of a specialization of the predicator 1338 suitable for assignment to the member datum accepts-markup-text 1192 of the class class 1036.

A match 1492 detects the reserved word "default," representing a singleton predicate relation. The match 1492 returns the singleton-terminal 1470. The match 1492 triggers an arg-default -predicate 1494, which provides an instance of a specialization of the predicator 1338 suitable for assignment to the member datum arg-default 1230 of the class argument 1044.

A match 1496 detects the reserved word "predicator," representing a singleton predicate relation. The match 1496 returns the singleton-terminal 1470. The match 1496 triggers an predicator-id -predicate 1498, which provides an instance of a specialization of the predicator 1338 suitable for assignment to the member datum predicator-id 1158 of the class module 1028.

A match 1500 detects the reserved word "audit," representing a plurality predicate relation. The match 1500 returns a plurality-terminal 1502. The plurality-terminal 1502 is associated with an instance of the predicator-plurality 1344. The match 1500 triggers an audit-requirements -predicate 1504, which provides an instance of a specialization of the predicator 1338 suitable for assignment to the member datum audit-requirements 1210 of the class class 1036.

A match 1506 detects the reserved word "require," representing a plurality predicate relation. The match 1506 returns the plurality-terminal 1502. The match 1506 triggers the audit-requirements-predicate 1504, which provides an instance of a specialization of the predicator 1338 suitable for assignment to the member datum audit-requirements 1210 of the class class 1036.

A match 1508 detects the reserved word "auditor-context," representing a singleton predicate relation. The match 1508 returns the singleton-terminal 1470. The match 1508 triggers an auditor-context-predicate 1510, which provides an instance of a specialization of the predicator 1338 suitable for assignment to the member datum auditor-context 1214 of the class class 1036.

A match 1512 detects the reserved word "auditor," representing a singleton predicate relation. The match 1512 returns the singleton-terminal 1470. The match 1512 triggers an auditor-id -predicate 1514, which provides an instance of a specialization of the predicator 1338 suitable for assignment to the member datum auditor-id 1144 of the class module 1028.

A match 1516 detects the reserved word "construct-element," representing a qualifier predicate relation. The match 1516 returns the qualifier-terminal 1480. The match 1516 triggers a constructs-markup-element-predicate 1518, which provides an instance of a specialization of the predicator 1338 suitable for assignment to the member datum constructs-markup-element 1188 of the class class 1036.

A match 1520 detects the reserved word "definition," representing a plurality predicate relation. The match 1520 returns the plurality-terminal 1502. The match 1520 triggers a definition-predicate 1522, which provides an instance of a specialization of the predicator 1338 suitable for assignment to the member datum definition 1242 of the class member-function 1048.

A match 1524 detects the reserved word "editor," representing a singleton predicate relation. The match 1524 returns the singleton-terminal 1470. The match 1524 triggers an editor-id -predicate 1526, which provides an instance of a specialization of the predicator 1338 suitable for assignment to the member datum editor-id 1138 of the class module 1028.

A match 1528 detects the reserved word "factory," representing a singleton predicate relation. The match 1528 returns the singleton-terminal 1470. The match 1528 triggers a factory-id -predicate 1530, which provides an instance of a specialization of the predicator 1338 suitable for assignment to the member datum factory-id 1140 of the class module 1028.

A match 1532 detects the reserved word "factory-root," representing a singleton predicate relation. The match 1532 returns the singleton-terminal 1470. The match 1532 triggers a factory-root-id-predicate 1534, which provides an instance of a specialization of the predicator 1338 suitable for assignment to the member datum factory-root-id 1142 of the class module 1028.

A match 1536 detects the reserved word "forward," representing a plurality predicate relation. The match 1536 returns the plurality-terminal 1502. The match 1536 triggers a forward-classes -predicate 1538, which provides an instance of a specialization of the predicator 1338 suitable for assignment to the member datum forward-classes 1032 of the class module 1028.

A match 1540 detects the reserved word "handle," representing a plurality predicate relation. The match 1540 returns the plurality-terminal 1502. The match 1540 triggers a handles-predicate 1542, which provides an instance of a specialization of the predicator 1338 suitable for assignment to the member datum handles 1266 of the class member-datum 1052.

A match 1544 detects the reserved word "handles," representing a plurality predicate relation. The match 1544 returns the plurality-terminal 1502. The match 1544 triggers the handles-predicate 1542, which provides an instance of a specialization of the predicator 1338 suitable for assignment to the member datum handles 1266 of the class member-datum 1052.

A match 1546 detects the reserved word "host," representing a singleton predicate relation. The match 1546 returns the singleton-terminal 1470. The match 1546 triggers a host-predicate 1548, which provides an instance of a specialization of the predicator 1338 suitable for assignment to the member datum host 1034 of the class module 1028.

A match 1550 detects the reserved word "indicates," representing a singleton predicate relation. The match 1550 returns the singleton-terminal 1470. The match 1550 triggers an indicates -predicate 1552, which provides an instance of a specialization of the predicator 1338 suitable for assignment to the member datum indicates 1244 of the class member-function 1048.

A match 1554 detects the reserved word "inhibit-predicator," representing a qualifier predicate relation. The match 1554 returns the qualifier-terminal 1480. The match 1554 triggers an inhibit-predicator-predicate 1556, which provides an instance of a specialization of the predicator 1338 suitable for assignment to the member datum inhibit-predicator 1262 of the class member-datum 1052.

A match 1558 detects the reserved word "init," representing a singleton predicate relation. The match 1558 returns the singleton-terminal 1470. The match 1558 triggers an init-predicate 1560, which provides an instance of a specialization of the predicator 1338 suitable for assignment to the member datum init 1250 of the class member-datum 1052.

A match 1562 detects the reserved word "inline," representing a plurality predicate relation. The match 1562 returns the plurality-terminal 1502. The match 1562 triggers an inline-definition -predicate 1564, which provides an instance of a specialization of the predicator 1338 suitable for assignment to the member datum inline-definition 1240 of the class member-function 1048.

Refer to FIG. 38. A match 1566 detects the reserved word "const," representing a qualifier predicate relation. The match 1566 returns the qualifier-terminal 1480. The match 1566 triggers an is-const-predicate 1568, which provides an instance of a specialization of the predicator 1338 suitable for assignment to the member datum is-const 1224 of the class operand 1042.

A match 1570 detects the reserved word "meron," representing a qualifier predicate relation. The match 1570 returns the qualifier-terminal 1480. The match 1570 triggers an is-meron-predicate 1572, which provides an instance of a specialization of the predicator 1338 suitable for assignment to the member datum is-meron 1246 of the class member-datum 1052.

A match 1574 detects the reserved word "mutable," representing a qualifier predicate relation. The match 1574 returns the qualifier-terminal 1480. The match 1574 triggers an is-mutable -predicate 1576, which provides an instance of a specialization of the predicator 1338 suitable for assignment to the member datum is-mutable 1248 of the class member-datum 1052.

A match 1578 detects the reserved word "pure," representing a qualifier predicate relation. The match 1578 returns the qualifier-terminal 1480. The match 1578 triggers an is-pure-predicate 1580, which provides an instance of a specialization of the predicator 1338 suitable for assignment to the member datum is-pure 1238 of the class member-function 1048.

A match 1582 detects the reserved word "static," representing a qualifier predicate relation. The match 1582 returns the qualifier-terminal 1480. The match 1582 triggers an is-static -predicate 1584, which provides an instance of a specialization of the predicator 1338 suitable for assignment to the member datum is-static 1234 of the class member-function 1048.

A match 1586 detects the reserved word "virtual," representing a qualifier predicate relation. The match 1586 returns the qualifier-terminal 1480. The match 1586 triggers an is-virtual -predicate 1588, which provides an instance of a specialization of the predicator 1338 suitable for assignment to the member datum is-virtual 1236 of the class member-function 1048.

A match 1590 detects the reserved word "commit," representing a qualifier predicate relation. The match 1590 returns the qualifier-terminal 1480. The match 1590 triggers a markup-commit -predicate 1592, which provides an instance of a specialization of the predicator 1338 suitable for assignment to the member datum markup-commit 1198 of the class class 1036.

A match 1594 detects the reserved word "configure," representing a qualifier predicate relation. The match 1594 returns the qualifier-terminal 1480. The match 1594 triggers a markup-configure -predicate 1596, which provides an instance of a specialization of the predicator 1338 suitable for assignment to the member datum markup-configure 1196 of the class class 1036.

A match 1598 detects the reserved word "note," representing a plurality predicate relation. The match 1598 returns the plurality-terminal 1502. The match 1598 triggers a notes-predicate 1600, which provides an instance of a specialization of the predicator 1338 suitable for assignment to the member datum notes 1118 of the class entity 1026.

A match 1602 detects the reserved word "notes," representing a plurality predicate relation. The match 1602 returns the plurality-terminal 1502. The match 1602 triggers the notes-predicate 1600, which provides an instance of a specialization of the predicator 1338 suitable for assignment to the member datum notes 1118 of the class entity 1026.

A match 1604 detects the reserved word "parser," representing a singleton predicate relation. The match 1604 returns the singleton-terminal 1470. The match 1604 triggers a parser-id-predicate 1606, which provides an instance of a specialization of the predicator 1338 suitable for assignment to the member datum parser-id 1148 of the class module 1028.

A match 1608 detects the reserved word "passage," representing a singleton predicate relation. The match 1608 returns the singleton-terminal 1470. The match 1608 triggers a passage-predicate 1610, which provides an instance of a specialization of the predicator 1338 suitable for assignment to the member datum passage 1114 of the class entity 1026.

A match 1612 detects the reserved word "downcast," representing a qualifier predicate relation. The match 1612 returns the qualifier-terminal 1480. The match 1612 triggers a provides-downcast -predicate 1614, which provides an instance of a specialization of the predicator 1338 suitable for assignment to the member datum provides-downcast 1204 of the class class 1036.

A match 1616 detects the reserved word "purpose," representing a singleton predicate relation. The match 1616 returns the singleton-terminal 1470. The match 1616 triggers a purpose-predicate 1618, which provides an instance of a specialization of the predicator 1338 suitable for assignment to the member datum purpose 1112 of the class entity 1026.

A match 1620 detects the reserved word "reflector," representing a singleton predicate relation. The match 1620 returns the singleton-terminal 1470. The match 1620 triggers a reflector-id -predicate 1622, which provides an instance of a specialization of the predicator 1338 suitable for assignment to the member datum reflector-id 1146 of the class module 1028.

A match 1624 detects the reserved word "remark," representing a plurality predicate relation. The match 1624 returns the plurality-terminal 1502. The match 1624 triggers a remarks-predicate 1626, which provides an instance of a specialization of the predicator 1338 suitable for assignment to the member datum remarks 1116 of the class entity 1026.

A match 1628 detects the reserved word "remarks," representing a plurality predicate relation. The match 1628 returns the plurality-terminal 1502. The match 1628 triggers the remarks-predicate 1626, which provides an instance of a specialization of the predicator 1338 suitable for assignment to the member datum remarks 1116 of the class entity 1026.

A match 1630 detects the reserved word "resolver," representing a singleton predicate relation. The match 1630 returns the singleton-terminal 1470. The match 1630 triggers a resolver-id -predicate 1632, which provides an instance of a specialization of the predicator 1338 suitable for assignment to the member datum resolver-id 1150 of the class module 1028.

A match 1634 detects the reserved word "resolver-id-field," representing a singleton predicate relation. The match 1634 returns the singleton-terminal 1470. The match 1634 triggers a resolver-id-field-predicate 1636, which provides an instance of a specialization of the predicator 1338 suitable for assignment to the member datum resolver-id-field 1152 of the class module 1028.

A match 1638 detects the reserved word "resolver-root," representing a singleton predicate relation. The match 1638 returns the singleton-terminal 1470. The match 1638 triggers a resolver-root-id-predicate 1640, which provides an instance of a specialization of the predicator 1338 suitable for assignment to the member datum resolver-root-id 1154 of the class module 1028.

A match 1642 detects the reserved word "tag," representing a plurality predicate relation. The match 1642 returns the plurality-terminal 1502. The match 1642 triggers a tags-predicate 1644, which provides an instance of a specialization of the predicator 1338 suitable for assignment to the member datum tags 1206 of the class class 1036.

A match 1646 detects the reserved word "tags," representing a plurality predicate relation. The match 1646 returns the plurality-terminal 1502. The match 1646 triggers the tags-predicate 1644, which provides an instance of a specialization of the predicator 1338 suitable for assignment to the member datum tags 1206 of the class class 1036.

A match 1648 detects the reserved word "term," representing a singleton predicate relation. The match 1648 returns the singleton-terminal 1470. The match 1648 triggers a term-predicate 1650, which provides an instance of a specialization of the predicator 1338 suitable for assignment to the member datum term 1108 of the class entity 1026.

A match 1652 detects the reserved word "title," representing a singleton predicate relation. The match 1652 returns the singleton-terminal 1470. The match 1652 triggers a title-predicate 1654, which provides an instance of a specialization of the predicator 1338 suitable for assignment to the member datum title 1110 of the class entity 1026.

A match 1656 detects the reserved word "viewer," representing a singleton predicate relation. The match 1656 returns the singleton-terminal 1470. The match 1656 triggers a viewer-id-predicate 1658, which provides an instance of a specialization of the predicator 1338 suitable for assignment to the member datum viewer-id 1136 of the class module 1028.

5.2.2 Lexical Analysis Double-Quote State

Refer to FIG. 39. The state double-quote 1350 corresponds to specialized lexical analysis in the context of double-quoted text.

A match 1660 detects a closing double quote. The match 1660 returns a quote-terminal 1662. The quote-terminal 1662 is associated with an instance of the parse-text 1336. The match 1660 transfers the lexer state to the initial 1348. The match 1660 triggers a quote-close 1664, which terminates accumulation of quote text, associating the accumulated quote text with the instance of the parse-text 1336.

A match 1666 detects an escaped double quote. The match 1666 triggers an escape-double-quote 1668, which accumulates a literal double quote to the quote text.

A match 1670 detects a C-style escape code for a newline. The match 1670 triggers an escape-newline 1672 which accumulates a newline to the quote text.

A match 1674 detects a C-style escape code for a tab. The match 1674 triggers an escape-tab 1676, which accumulates a tab to the quote text.

A match 1678 detects a C-style escape code for a backslash (the escape character). The match 1678 triggers an escape-escape 1680, which accumulates a literal backslash to the quote text.

A match 1682 detects a newline, which is invalid. The match 1682 triggers a quote-newline 1684, which results in a parse error.

A match 1686 matches any character. The match 1686 triggers a quote-accumulate 1688, which accumulates the matched character to the quote text.

5.2.3 Lexical Analysis Single-Quote State

Refer to FIG. 40. The state single-quote 1352 corresponds to specialized lexical analysis in the context of single-quoted text.

A match 1690 detects a closing single quote. The match 1690 returns the quote-terminal 1662. The match 1690 transfers the lexer state to the initial 1348. The match 1690 triggers the quote-close 1664, which terminates accumulation of quote text, associating the accumulated quote text with the instance of the parse-text 1336 associated with the quote-terminal 1662.

A match 1692 detects an escaped single quote. The match 1692 triggers an escape-single-quote 1694, which accumulates a literal single quote to the quote text.

A match 1696 detects a C-style escape code for a newline. The match 1696 triggers the escape-newline 1672, which accumulates a newline to the quote text.

A match 1698 detects a C-style escape code for a tab. The match 1698 triggers the escape-tab 1676, which accumulates a tab to the quote text.

A match 1700 detects a C-style escape code for a backslash (the escape character). The match 1700 triggers the escape-escape 1680, which accumulates a literal backslash to the quote text.

A match 1702 detects a newline, which is invalid. The match 1702 triggers the quote-newline 1684, which results in a parse error.

A match 1704 matches any character. The match 1704 triggers the quote-accumulate 1688, which accumulates the matched character to the quote text.

5.2.4 Lexical Analysis Multiline-Quote State

Refer to FIG. 41. The state multi-quote 1354 corresponds to specialized lexical analysis in the context of a multi-line quote.

A match 1706 detects the terminator of a multi-line quote. The match 1706 returns the quote-terminal 1662. The match 1706 transfers the lexer state to the initial 1348. The match 1706 triggers the quote-close 1664, which terminates accumulation of quote text, associating the accumulated quote text with the instance of the parse-text 1336 associated with the quote-terminal 1662.

A match 1708 detects a C-style escape for a backquote. The match 1708 triggers an escape-backquote 1710, which accumulates a literal backquote to the quote text.

A match 1712 detects a C-style escape code for a newline. The match 1712 triggers the escape-newline 1672, which accumulates a newline to the quote text.

A match 1714 detects a C-style escape code for a tab. The match 1714 triggers the escape-tab 1676, which accumulates a tag to the quote text.

A match 1716 detects a C-style escape code for a backslash (the escape character). The match 1716 triggers the escape-escape 1680, which accumulates a literal backslash to the quote text.

A match 1718 detects a newline, which is permissible in a multi-line quote. The match 1718 triggers an accumulate-newline 1720, which increments the parser's internal line counter and accumulates a newline to the quote text.

A match 1722 matches any character. The match 1722 triggers the quote-accumulate 1688, which accumulates the matched character to the quote text.

5.3 Grammar

FIG. 42 begins a depiction of exemplary grammar rules for the grammar 1002.

A rule 1724 produces a start 1726 from an empty expression. The rule 1724 indicates that the empty expression is a valid expression in the grammar 1002.

A rule 1728 produces the start 1726. The rule 1728 consumes the start 1726 and a module 1730. The rule 1728 indicates a valid expression followed by a module 1730 is a valid expression in the grammar 1002. The module 1730 corresponds to a module specification. The module 1730 represents an instance of the module 1028. The rule 1728 triggers an accept-module 1732, which clears the internal module scope.

A rule 1734 produces the start 1726. The rule 1734 consumes the start 1726 and a scoped-class 1736. The rule 1734 indicates that a valid expression followed by a scoped-class 1736 is a valid expression. The scoped-class 1736 corresponds to a class scope specification. The scoped-class 1736 represents an instance of the class 1036. This rule permits the specification of a module and even a class to be distributed across several expressions (an thus across several files).

A rule 1738 produces the module 1730. The rule 1738 consumes a module-body 1740 and the close-curly-terminal 1374. The rule 1738 indicates the successful termination of a module-body 1740 by close-curly-terminal 1374. The module-body 1740 corresponds to an unclosed module specification, capable of accepting class specifications, host member specifications, class predicate specifications, or a module close terminal. The module-body 1740 represents an instance of the module 1028.

A rule 1742 produces the module-body 1740. The rule 1742 consumes the id-terminal 1460, a optional-predicates 1744, and the open-curly-terminal 1370. The optional-predicates 1744 represents an instance of the predicator-sequence 1346. The rule 1742 triggers a new-module 1746, retrieves a previously specified module identified by the id-terminal 1460), or, lacking a prior specification, instantiates a new instance of the module 1028. The module-body 1740 corresponds to the module identifier, optional predicates, and module open terminal of a module specification. The module-body 1740 corresponds to an unclosed module specification, capable of accepting class specifications, host member specifications, class predicate specifications, or a module close terminal. The new-module 1746 applies the predicator-sequence 1346, if any. The module instance is assigned to a current module scope in the parser 1008, and is associated with the left-hand side module-body 1740.

A rule 1748 produces the module-body 1740. The rule 1748 consumes the module-body 1740 and a class 1750. The class 1750 represents an instance of the class 1036. The rule 1748 corresponds to the selection of a class specification for the module content of a module specification. The rule 1748 triggers a module-accept-class 1752, which takes note that the class instance associated with the class 1750 is a root class of the module instance associated with the module-body 1740.

A rule 1754 produces the module-body 1740. The rule 1754 consumes the module-body 1740 and a members 1756. The members 1756 represents an instance of the parse-members 1330. The rule 1754 corresponds to the selection of a host member specification for the module content of a module specification. The rule 1754 triggers a module-accept-members 1758, which accumulates the associated instance of the parse-members 1330 to the module member datum host 1034, an instance of the host-class 1040. Members specified in module scope are thus accumulated to the module host.

A rule 1760 produces the module-body 1740. The rule 1760 consumes the module-body 1740 and a predicates 1762. The predicates 1762 represents an instance of the predicator-sequence 1346. The rule 1760 corresponds to the selection of a module predicates specification for the module content of a module specification. The rule 1760 triggers a module-accept-predicates 1764, which applies the associated instance of the predicator-sequence 1346 to the instance of the host-class 1040 indicated by the host 1034 of the instance of the module 1028 associated with the module-body 1740. Thus predicates specified in module scope are applied to the module host.

A rule 1766 produces the scoped-class 1736. The rule 1766 consumes a scoped-class-body 1768 and the close-curly-terminal 1374. The scoped-class 1736 corresponds to a class scope specification. The scoped-class-body 1768 represents an instance of the class 1036. The rule 1766 indicates the closing of a class scope.

A rule 1770 produces the scoped-class-body 1768. The rule 1770 consumes the id-terminal 1460, the scope-terminal 1366, the id-terminal 1460, and the open-curly-terminal 1370. The scoped-class-body 1768 corresponds to the scope module identifier, scope terminal, scope class identifier, and class open terminal of a class scope specification. The scoped-class-body 1768 is capable of accepting members specifications, and class specifications. In an alternative embodiment, class predicate specifications could also be accepted. The rule 1770 indicates the opening of a class scope. The rule 1770 triggers a resolve-scoped-class 1772, which resolves the first id-terminal 1460 to a module. The second id-terminal 1460 is then resolved to a class in the resolved module. The resolved class is associated with the left-hand side scoped-class-body 1768. The resolved module is assigned to the current module scope.

A rule 1774 produces the scoped-class-body 1768. The rule 1774 consumes the scoped-class-body 1768 and the class 1750. The rule 1774 corresponds to the selection of a class specification in a class content specification. The rule 1774 indicates the specification of a class within a class scope, thus providing genus-species associations between the containing and contained class. The rule 1774 triggers a class-accept-class 1776, which takes note of the genus-species relationships by assignments to the genera 1176 of the contained class (associated with the class 1750 and the species 1180 of the containing class (associated with the scoped-class -body 1768).

A rule 1778 produces the scoped-class-body 1768. The rule 1778 consumes the scoped-class-body 1768 and the members 1756. The rule 1778 corresponds to the selection of a members specification in a class content specification. The rule 1778 indicates the specification of members within a class scope. The rule 1778 triggers a class-accept-members 1780, which accumulates the members associated with the members 1756 to the class associated with the scoped-class-body 1768.

Refer to FIG. 43. A rule 1782 produces the class 1750. The rule 1782 consumes a class-body 1784 and the close-curly-terminal 1374. The class 1750 corresponds to a class specification. The class-body 1784 represents an instance of the class 1036. The rule 1782 indicates the closing of a class scope.

A rule 1786 produces the class-body 1784. The rule 1786 consumes the id-terminal 1460, the optional-predicates 1744, and the open-curly-terminal 1370. The class-body 1784 corresponds to an unclosed class specification, capable of accepting a class members specification, a class specification, and a class predicates specification. The rule 1782 indicates the opening of a class scope. The rule 1786 triggers a new-class 1788, creates a new instance of the class 1036, accumulates the class to the prevailing module scope, and applies the associated predicates, if any, to the new class. The newly created class is associated with the left-hand side class-body 1784.

A rule 1790 produces the class-body 1784. The rule 1790 consumes the class-body 1784 and the class 1750. The rule 1790 corresponds to the selection of a class specification in a class content specification. The rule 1790 indicates the specification of a class within a class scope, as already described for the rule 1774. The rule 1790 triggers the class-accept-class 1776.

A rule 1792 produces the class-body 1784. The rule 1792 consumes the class-body 1784 and the members 1756. The rule 1792 corresponds to the selection of a members specification in a class content specification. The rule 1792 indicates the specification of members within a class scope, as already described for the rule 1778. The rule 1792 triggers the class-accept-members 1780.

A rule 1794 produces the class-body 1784. The rule 1794 consumes the class-body 1784 and the predicates 1762. The rule 1794 corresponds to the selection of a class predicates specification in a class content specification. The rule 1794 triggers a class-accept-predicates 1796, which applies the associated predicates to the associated class.

A rule 1798 produces the members 1756. The rule 1798 consumes a members-body 1800 and the semicolon-terminal 1402. The members 1756 corresponds to a host members specification and a class member specification. The members-body 1800 represents an instance of the parse-members 1330. The rule 1798 indicates the termination of the specification of one or more members.

A rule 1802 produces the members-body 1800. The rule 1802 consumes a type 1804 and a member 1806. The type 1804 represents an instance of the type 1054. The members-body 1800 corresponds to an unclosed members specification, capable of accepting a member specification. The rule 1802 corresponds to the acceptance of a member specification by a host members specification and a class members specification. The rule 1802 indicates the specification of one or more members. The member 1806 represents an instance of the member 1046. The rule 1802 triggers a new-members 1808, which creates an instance of the parse-members 1330. The associated type initializes the new instance of the parse-members 1330. The new instance of the parse-members 1330 is associated with the left-hand side members-body 1800. The instance of the member 1046 associated with the member 1806 is accumulated to the new instance of the parse-members 1330.

A rule 1810 produces the members-body 1800. The rule 1810 consumes the members-body 1800, the comma-terminal 1406, and the member 1806. The rule 1810 corresponds to the acceptance of an additional member specification by a host members specification and a class members specification. The rule 1810 indicates an additional member specification sharing a type specification with the preceding member specification. The rule 1810 triggers a append-members 1812, which accumulates the instance of the member 1046 associated with the member 1806 to the instance of the parse-members 1330 associated with the right-hand-side members-body 1800.

A rule 1814 produces the member 1806. The rule 1814 consumes a datum 1816. The datum 1816 corresponds to a datum specification. The rule 1814 corresponds to the selection of a datum specification for a member specification. The datum 1816 represents an instance of the member 1046. The rule 1814 indicates the acceptability of a member datum as a member.

A rule 1818 produces the member 1806. The rule 1818 consumes a method 1820. The method 1820 corresponds to a method specification. The rule 1818 corresponds to the selection of a method specification for a member specification. The method 1820 represents an instance of the member 1046. The rule 1818 indicates the acceptability of a member function as a member.

A rule 1822 produces the datum 1816. The rule 1822 consumes the id-terminal 1460 and the optional-predicates 1744. The datum 1816 corresponds to a datum specification. The optional-predicates 1744 corresponds to an optional datum predicates specification. The rule 1822 indicates the specification of a member datum. The rule 1822 triggers a new-datum 1824, which instantiates a new instance of the member-datum 1052, which is associated with the datum 1816. The associated predicates, if any, are applied to the new datum.

A rule 1826 produces the method 1820. The rule 1826 consumes the id-terminal 1460, a args 1828, and the optional-predicates 1744. The method 1820 corresponds to a method specification. The args 1828 corresponds to an arguments specification. The optional-predicates 1744 corresponds to an optional method predicates specification. The args 1828 represents an instance of the parse-arguments 1332. The rule 1826 indicates the specification of a member function. The rule 1826 triggers a new-method 1830, which instantiates a new instance of the member -function 1048, which is associated with the method 1820. The associated predicates, if any, are applied to the new member function.

A rule 1832 produces the args 1828. The rule 1832 consumes the open-paren-terminal 1386 and the close-paren-terminal 1390. The args 1828 corresponds to an arguments specification. The rule 1832 indicates the acceptability of an empty arguments list. The rule 1832 triggers an empty-args 1834, which creates a new instance of the parse-arguments 1332. The new instance of the parse-arguments 1332 is associated with the args 1828.

A rule 1836 produces the args 1828. The rule 1836 consumes a args-body 1838 and the close-paren-terminal 1390. The args 1828 corresponds to an arguments specification. The args-body 1838 corresponds to an unclosed arguments specification, capable of accepting an argument specification. The args-body 1838 represents an instance of the parse-arguments 1332. The rule 1836 indicates the closing of a non-empty arguments list.

A rule 1840 produces the args-body 1838. The rule 1840 consumes the open-paren-terminal 1386 and a arg 1842. The arg 1842 corresponds to an argument specification. The args-body 1838 corresponds to an unclosed arguments specification, capable of accepting an argument specification. The rule 1840 indicates the opening of a non-empty arguments list. The arg 1842 represents an instance of the argument 1044. The rule 1840 triggers a new-args 1844, which creates a new instance of the parse-arguments 1332. The associated instance of the argument 1044 is accumulated to the new instance of the parse-arguments 1332. The new instance of the parse-arguments 1332 is associated with the args-body 1838.

A rule 1846 produces the args-body 1838. The rule 1846 consumes the args-body 1838, the comma-terminal 1406, and the arg 1842. The arg 1842 corresponds to an argument specification. The args-body 1838 corresponds to an unclosed arguments specification, capable of accepting an argument specification. The rule 1846 indicates the continuation of a non-empty arguments list. The rule 1846 triggers an append-args 1848, which accumulates the instance of the argument 1044 associated with the arg 1842 to the instance of the parse-arguments 1332 associated with the right-hand-side args-body 1838. The instance of the parse-arguments 1332 is associated with the left-hand-side args-body 1838.

A rule 1850 produces the arg 1842. The rule 1850 consumes the type 1804 and the optional-predicates 1744. The arg 1842 corresponds to an argument specification. The type 1804 corresponds to a type specification. The optional-predicates 1744 corresponds to an optional argument predicates specification. The rule 1850 indicates the specification of a new argument. The rule 1850 triggers a new-mod-arg 1852, which creates a new instance of the argument 1044. The associated instance of the type 1054 is assigned to the type 1226 of the new instance of the argument 1044. The predicates, if any, are applied to the new instance of the argument 1044. The new instance of the argument 1044 is associated with the arg 1842.

A rule 1854 produces the arg 1842. The rule 1854 consumes the type 1804, the id-terminal 1460, and the optional-predicates 1744. The arg 1842 corresponds to an argument specification. The type 1804 corresponds to a type specification. The optional-predicates 1744 corresponds to an optional argument predicates specification. The rule 1854 indicates the specification of a new argument with a dummy identifier. The rule 1854 triggers a new-mod-arg-dummy 1856, which creates a new instance of the argument 1044. The associated instance of the type 1054 is assigned to the type 1226 of the new instance of the argument 1044. The predicates, if any, are applied to the new instance of the argument 1044. The text of the id-terminal 1460 is assigned to the scope-id 1222. The new instance of the argument 1044 is associated with the arg 1842.

Refer to FIG. 44. A rule 1858 produces the optional-predicates 1744. The rule 1858 indicates the acceptability of the absence of predicates. The optional-predicates 1744 corresponds to an optional module predicates specification, to an optional class predicates specification, to an optional datum predicates specification, to an optional method predicates specification, and an optional arguments predicates specification. The rule 1858 triggers an empty-predicates 1860, which associates a null pointer with the optional-predicates 1744.

A rule 1862 produces the optional-predicates 1744. The rule 1862 consumes the predicates 1762. The predicates 1762 corresponds to a predicates specification. The instance of the predicator-sequence 1346 associated with the predicates 1762 is associated with the optional-predicates 1744.

A rule 1864 produces the predicates 1762. The rule 1864 consumes a predicates-body 1866 and the close-square-terminal 1382. The predicates 1762 corresponds to a predicates specification. The predicates-body 1866 corresponds to an unclosed predicates specification, capable of accepting a predicate specification. The rule 1864 indicates the completion of a predicates specification. The predicates-body 1866 represents an instance of the predicator-sequence 1346, which is associated with the predicates 1762.

A rule 1868 produces the predicates-body 1866. The rule 1868 consumes the open-square-terminal 1378 and a predicate 1870. The predicates-body 1866 corresponds to an unclosed predicates specification, capable of accepting a predicate specification. The predicate 1870 corresponds to a predicate specification, which is accepted by the unclosed predicates specification. The rule 1868 indicates the opening of a predicate scope. The predicate 1870 represents an instance of the predicator 1338. The rule 1868 triggers a new-predicates 1872, which creates a new instance of the predicator-sequence 1346, and accumulates the associated instance of the predicator 1338 to the new instance of the predicator-sequence 1346. The new instance of the predicator-sequence 1346 is associated with the predicates-body 1866.

A rule 1874 produces the predicates-body 1866. The rule 1874 consumes the predicates-body 1866, the semicolon-terminal 1402, and the predicate 1870. The predicates-body 1866 corresponds to an unclosed predicates specification, capable of accepting an additional predicate specification. The predicate 1870 corresponds to an additional predicate specification, which is accepted by the unclosed predicates specification. The rule 1874 indicates the specification of an additional predicate in a predicate scope. The rule 1874 triggers an append-predicate 1876, which accumulates the instance of the predicator 1338 associated with the predicate 1870 to the instance of the predicator-sequence 1346 associated with the right-hand-side predicates-body 1866. The instance of the predicator-sequence 1346 is associated with the left-hand-side predicates-body 1866.

A rule 1878 produces the predicates-body 1866. The rule 1878 consumes the predicates-body 1866 and the semicolon-terminal 1402. The rule 1878 indicates the acceptability of a trailing semicolon, normally a separator. This is "syntactic sugar" provided for the convenience of the developer.

A rule 1880 produces the predicate 1870. The rule 1880 consumes a qualifier 1882. The predicate 1870 corresponds to a predicate specification. The qualifier 1882 corresponds to a qualifier specification. The rule 1880 corresponds to the selection of a qualifier specification for a predicate specification and for an additional predicate specification. The rule 1880 indicates the acceptability of a qualifier as a predicate. The qualifier 1882 represents an instance of the predicator-qualifier 1340. The instance of the predicator-qualifier 1340 is associated with the predicate 1870.

A rule 1884 produces the predicate 1870. The rule 1884 consumes a singleton 1886. The predicate 1870 corresponds to a predicate specification. The singleton 1886 corresponds to a singleton specification. The rule 1884 corresponds to the selection of a singleton specification for a predicate specification and for an additional predicate specification. The rule 1884 indicates the acceptability of a singleton as a predicate. The singleton 1886 represents an instance of the predicator-singleton 1342. The instance of the predicator-singleton 1342 is associated with the predicate 1870.

A rule 1888 produces the predicate 1870. The rule 1888 consumes a plurality 1890. The predicate 1870 corresponds to a predicate specification. The plurality 1890 corresponds to a plurality specification. The rule 1888 corresponds to the selection of a plurality specification for a predicate specification and for an additional predicate specification. The rule 1888 indicates the acceptability of a plurality as a predicate. The plurality 1890 represents an instance of the predicator-plurality 1344. The instance of the predicator-plurality 1344 is associated with the predicate 1870.

A rule 1892 produces the qualifier 1882. The rule 1892 consumes the qualifier-terminal 1480. The qualifier 1882 corresponds to a qualifier specification. The associated instance of the predicator-qualifier 1340 represented by the qualifier-terminal 1480 is associated with the qualifier 1882.

A rule 1894 produces the singleton 1886. The rule 1894 consumes the singleton-terminal 1470 and a object 1896. The singleton 1886 corresponds to a singleton specification. The object 1896 corresponds to an object expression. The object 1896 represents an instance of the parse-text 1336. The rule 1894 triggers a singleton-object 1898, which assigns the object text to the instance of the predicator-singleton 1342 associated with the singleton-terminal 1470. The instance of the predicator-singleton 1342 is associated with the singleton 1886.

A rule 1900 produces the plurality 1890. The rule 1900 consumes the plurality-terminal 1502 and the object 1896. The plurality 1890 corresponds to a plurality specification. The object 1896 corresponds to an object expression. The rule 1900 triggers a plurality-object 1902, which accumulates the object text to the instance of the predicator-plurality 1344 associated with the plurality-terminal 1502. The instance of the predicator-plurality 1344 is associated with the plurality 1890.

A rule 1904 produces the plurality 1890. The rule 1904 consumes the plurality 1890, the comma-terminal 1406, and the object 1896. The plurality 1890 corresponds to a plurality specification. The object 1896 corresponds to an additional object expression. The rule 1904 triggers a plurality-append-object 1906, which accumulates the object text to the instance of the predicator-plurality 1344 associated with the right-hand-side plurality 1890. The instance of the predicator-plurality 1344 is associated with the left-hand-side plurality 1890.

A rule 1908 produces the plurality 1890. The rule 1908 consumes the plurality 1890 and the comma-terminal 1406. The rule 1908 indicates the acceptability of a trailing comma, normally a separator. This is "syntactic sugar" provided for the convenience of the developer.

A rule 1910 produces the object 1896. The object 1896 corresponds to an object expression. The rule 1910 consumes a text 1912. The text 1912 represents an instance of the parse-text 1336.

A rule 1914 produces the object 1896. The rule 1914 consumes the object 1896 and the text 1912. The object 1896 corresponds to an object expression. The rule 1914 triggers an append-object-text 1916, which accumulates the text associated with the text 1912 to the text of the object 1896. This permits C-style string concatenation when adjacent strings are separated only by white space.

A rule 1918 produces the text 1912. The rule 1918 consumes the id-terminal 1460.

A rule 1920 produces the text 1912. The rule 1920 consumes the quote-terminal 1662.

Refer to FIG. 45. A rule 1922 produces the type 1804. The type 1804 corresponds to a type specification. The rule 1922 consumes the void-terminal 1418. The rule 1922 indicates the acceptability of a void type as a type.

A rule 1924 produces the type 1804. The rule 1924 consumes a compound-type 1926. The type 1804 corresponds to a type specification. The compound-type 1926 corresponds to a compound type specification. The compound-type 1926 represents an instance of the type 1054. The rule 1924 indicates the acceptability of a compound type as a type.

A rule 1928 produces the type 1804. The rule 1928 consumes a reference-type 1930. The type 1804 corresponds to a type specification. The reference-type 1930 corresponds to a reference type specification. The reference-type 1930 represents an instance of the reference-type 1068. The rule 1928 indicates the acceptability of a reference type as a type.

A rule 1932 produces the type 1804. The rule 1932 consumes a value-type 1934. The type 1804 corresponds to a type specification. The value-type 1934 corresponds to a value type specification. The value-type 1934 represents an instance of the value-type 1058. The rule 1932 indicates the acceptability of a value type as a type.

A rule 1936 produces the reference-type 1930. The rule 1936 consumes the id-terminal 1460. The rule 1936 triggers a reference-type 1938, which creates a new instance of the reference-type 1068. The text associated with the id-terminal 1460 is assigned to the reference-class-id 1284 of the new instance of the reference-type 1068. The new instance of the reference-type 1068 is associated with the reference-type 1930.

A rule 1940 produces the value-type 1934. The rule 1940 consumes the bit-terminal 1430. The rule 1940 indicates the acceptability of a bit type as a value type.

A rule 1942 produces the value-type 1934. The rule 1942 consumes the int-terminal 1424. The rule 1942 indicates the acceptability of an integer type as a value type.

A rule 1944 produces the value-type 1934. The rule 1944 consumes the card-terminal 1436. The rule 1944 indicates the acceptability of a cardinal type as a value type.

A rule 1946 produces the value-type 1934. The rule 1946 consumes the text-terminal 1442. The rule 1946 indicates the acceptability of a text type as a value type.

Refer to FIG. 46. A rule 1948 produces the compound-type 1926. The rule 1948 consumes the seq-terminal 1456, the open-angle-terminal 1394, the reference-type 1930, and the close-angle-terminal 1398. The rule 1948 corresponds to acceptance of a reference sequence type specification. The rule 1948 indicates the acceptability of a reference sequence type as a compound type. The rule 1948 triggers a reference-seq-type 1950, which creates a new instance of the reference-sequence-type 1076. The reference-range 1302 of the new instance of the reference-sequence-type 1076 is assigned from the instance of the reference-type 1068 associated with the reference-type 1930. The new instance of the reference-sequence-type 1076 is associated with the compound-type 1926.

A rule 1952 produces the compound-type 1926. The rule 1952 consumes the seq-terminal 1456, the open-angle-terminal 1394, the value-type 1934, and the close-angle-terminal 1398. The rule 1952 corresponds to acceptance of a reference value type specification. The rule 1952 indicates the acceptability of a value sequence type as a compound type. The rule 1952 triggers a value-seq-type 1954, which creates a new instance of the value-sequence-type 1074. The value-range 1300 of the new instance of the value-sequence-type 1074 is assigned from the instance of the value-type 1058 associated with the value-type 1934. The new instance of the value-sequence-type 1074 is associated with the compound-type 1926.

A rule 1956 produces the compound-type 1926. The rule 1956 consumes the set-terminal 1448, the open-angle-terminal 1394, the reference-type 1930, and the close-angle-terminal 1398. The rule 1956 corresponds to acceptance of a reference set type specification. The rule 1956 indicates the acceptability of a reference set type as a compound type. The rule 1956 triggers a reference-set-type 1958, which creates a new instance of the reference-set-type 1082. The reference-range 1308 of the new instance of the reference-set-type 1082 is assigned from the instance of the reference-type 1068 associated with the reference-type 1930. The new instance of the reference-set-type 1082 is associated with the compound-type 1926.

A rule 1960 produces the compound-type 1926. The rule 1960 consumes the set-terminal 1448, the open-angle-terminal 1394, the value-type 1934, and the close-angle-terminal 1398. The rule 1960 corresponds to acceptance of a value set type specification. The rule 1960 indicates the acceptability of a value set type as a compound type. The rule 1960 triggers a value-set-type 1962, which creates a new instance of the value-set-type 1080. The value-range 1306 of the new instance of the value-set-type 1080 is assigned from the instance of the value-type 1058 associated with the value-type 1934. The new instance of the value-set-type 1080 is associated with the compound-type 1926.

A rule 1964 produces the compound-type 1926. The rule 1964 consumes the map-terminal 1452, the open-angle-terminal 1394, the value-type 1934, the comma-terminal 1406, the reference-type 1930, and the close-angle-terminal 1398. The rule 1964 corresponds to acceptance of an index map type specification. The rule 1964 indicates the acceptability of an index map type as a compound type. The rule 1964 triggers an index-map-type 1966, which creates a new instance of the index-map-type 1086. The value-domain 1314 of the new instance of the index-map -type 1086 is assigned from the instance of the value-type 1058 associated with the value-type 1934. The reference-range 1316 of the new instance of the index-map-type 1086 is assigned from the instance of the reference-type 1068 associated with the reference-type 1930. The new instance of the index-map-type 1086 is associated with the compound-type 1926.

A rule 1968 produces the compound-type 1926. The rule 1968 consumes the map-terminal 1452, the open-angle-terminal 1394, the value-type 1934, the comma-terminal 1406, the value-type 1934, and the close-angle-terminal 1398. The rule 1968 corresponds to acceptance of a convert map type specification. The rule 1968 indicates the acceptability of a conversion map type as a compound type. The rule 1968 triggers a convert-map-type 1970, which creates a new instance of the convert-map-type 1092. The value-domain 1326 of the new instance of the convert-map-type 1092 is assigned from the instance of the value-type 1058 associated with the first value-type 1934. The value-range 1328 of the new instance of the convert-map-type 1092 is assigned from the instance of the value-type 1058 associated with the second value-type 1934. The new instance of the convert-map-type 1092 is associated with the compound-type 1926.

A rule 1972 produces the compound-type 1926. The rule 1972 consumes the map-terminal 1452, the open-angle-terminal 1394, the reference-type 1930, the comma-terminal 1406, the reference-type 1930, and the close-angle-terminal 1398. The rule 1972 corresponds to acceptance of a bind map type specification. The rule 1972 indicates the acceptability of a binding map type as a compound type. The rule 1972 triggers a bind-map-type 1974, which creates a new instance of the bind-map-type 1090. The reference-domain 1322 of the new instance of the bind-map-type 1090 is assigned from the instance of the reference-type 1068 associated with the first reference-type 1930. The reference-range 1324 of the new instance of the bind-map-type 1090 is assigned from the instance of the reference-type 1068 associated with the second reference-type 1930. The new instance of the bind-map-type 1090 is associated with the compound-type 1926.

A rule 1976 produces the compound-type 1926. The rule 1976 consumes the map-terminal 1452, the open-angle-terminal 1394, the reference-type 1930, the comma-terminal 1406, the value-type 1934, and the close-angle-terminal 1398. The rule 1976 corresponds to acceptance of a scale map type specification. The rule 1976 indicates the acceptability of a scale map type as a compound type. The rule 1976 triggers a scale-map-type 1978, which creates a new instance of the scale-map-type 1088. The reference-domain 1318 of the new instance of the scale-map-type 1088 is assigned from the instance of the reference-type 1068 associated with the reference-type 1930. The value-range 1320 of the new instance of the scale-map-type 1088 is assigned from the instance of the value-type 1058 associated with the value-type 1934. The new instance of the scale-map-type 1088 is associated with the compound-type 1926.

6 Example Module Specification

A module specification suitable for a simple application demonstrates the module specification language. The demonstration application recursively scans one or more file-system directories looking for media files. The media files which are detected are presented in a collection of interlinked HTML pages. The pages of the presentation reflect the directory organization of the scanned directories. Each discovered media file is presented in a hypertext link. The pages of the presentation are suitable for service by a web server running on a dedicated media device, such as a digital video recorder. Activation of a link presenting a particular media file generates a request to play the associated media on the dedicated media device. The application may form a potentially useful element for remote, web-oriented management of a dedicated media device.

The demonstration application uses a representation of media files in a file system. The representation uses an object-oriented module including a family of interrelated classes. The classes represent files and directories. The object-oriented module is specified using a module specification language.

Refer to FIG. 47, which depicts a module specification represented according to the module specification language. An example module specification specifies the module media-scanner 1980, which represents media files arranged in a file system. The module specification includes an module predicates specification, specifying a host and a viewer singleton predicates.

Inside the module scope, an example host members specifications is exemplified by a root-files 1982, which is specified to have a reference set type. The root-files 1982, specifies a set of instances of the file 1984. The root-files 1982 represents the top-level collection of files in a scan. The root-files 1982 is specified as a meron, providing an example of a qualifier predicate specification.

The example specification includes several examples of class specifications. A class file 1984 represents a file in a file system, including regular files and directories. The file 1984 is specified in the module scope and hence has no genera. A class directory 1986 represents a file system directory, potentially containing files, some of which may themselves be directories. The directory 1986 is an example of a class specification in a class scope, thus indicating the directory 1986 is a specialization of the file 1984.

A class top-directory 1988 represents a topmost directory from which a scan has been initiated. The top-directory 1988 specializes the directory 1986. A class regular-file 1990 represents a regular file, i.e. a file which is not a directory. The regular-file 1990 specializes the file 1984. A class audio-file 1992 represents an audio file. The audio-file 1992 specializes the regular-file 1990. A class video-file 1994 represents a video file. The video-file 1994 specializes the regular-file 1990.

Other member data specifications include, for the file 1984, a member datum parent 1996 and a member datum name 1998. The parent 1996 represents the directory containing a particular file. The name 1998 represents the name associated with a particular file in a particular directory. For the directory 1986, a member datum files 2000 is specified. The files 2000 represents the collection of files contained in a particular directory.

7 Alternative Embodiments

The exemplary grammar 1002 is presented in a form which is convenient for ease of processing, but which may be less convenient for human readability. The provision of syntax-directed translation is eased by structuring the grammar so that responders are provided with a single element per response, with that element fully specialized. For human readability, however, it may be more convenient to specify a sequence of possibly heterogenous elements.

In particular, a module specification consists of a module identifier, a module open terminal, an optional module predicate specification, a module content specification, and a module close terminal. The module content specification consists of a mixture of class specifications, module predicate specifications, and host members specifications. The preceding description may be convenient for a human reader, but for syntax directed translation, it is convenient to structure the grammar so the mixture of class specifications, module predicate specifications, and host member specifications is implicitly represented as a collection of rules, each rule having a representation of an "unclosed module" and a particular element to accept.

Thus a rule for a module to accept a class specification consumes an unclosed module and a class specification, producing the unclosed module, which is then available for additional augmentation or closure. Likewise, a rule for a module to accept a host members specification consumes an unclosed module and a members specification, producing the unclosed module, which is then available for additional augmentation or closure. Likewise for the module predicates specification. Thus the heterogenous collection of the module content is transformed to a family of homogenous, singular rules each of which operates with an unclosed module and a particular accepted element.

The pattern of replacing a heterogeneous collection with a family of homogeneous, singleton rules operating on an unclosed container is replicated for the module specification, the class specification, the members specification, and the predicates specification. In an alternative embodiment, the grammar could directly accept the corresponding heterogeneous collections, but this would necessitate additional complexity in the responders to the grammar.

The exemplary grammar does not accept class predicates in a class scope specification; an alternative embodiment accepts class predicates in a class scope specification.

The specializations of the value-type 1058 in the exemplary embodiment are representative but far from comprehensive. In an alternative embodiments, value types representing integers, floating point numbers, dates, times, geographical positions, etc. could be provided. The specializations of the compound-type 1070 in the exemplary embodiment are sufficient for a wide range of applications, but additional compound types could be provided in an alternative embodiment. Compound types representing lists, heaps, multimaps, multisets, graphs, vectors, matrices, etc, could be provided in an alternative embodiment. Provision for compound types of compound types could also be provided in an alternative embodiment. The effect of nested compound types is readily obtained by providing categorical classes which simply contain the nested type.

In the exemplary embodiments of the categorical classes, member data has been exhibited in a public scope. The exemplary parser responders utilize categorical class data accordingly. Exhibition of member data in a public scope enhances clarity and save space in exposition. In an alternative embodiment, member data would be defined in a private scope, and access methods (member functions) would be provided to manipulate member data indirectly, in accordance with normal practice in object-oriented programming.

I claim:

1. A software framework including computer-readable instructions stored on a non-transitory computer-readable medium, comprising:
   a module identifier, a module open terminal, a module content specification, and
   a module close terminal;
   said module content specification having at least one specification selected from the group consisting of a class specification, and a host members specification;
   said class specification having a class identifier, a class open terminal, a class content specification, and a class close terminal;
   said class content specification optionally having one or more specifications selected from the group consisting of said class specification, and a class members specification;
   said host members specification and said class members specification each having a type specification, a member specification, at least one optional additional member specification, and a members terminator terminal;
   said additional member specification, if any, having a preceding member specification, and said additional member specification separated from said preceding member specification by a member separator terminal,
   said member specification selected from the group consisting of a datum specification and a method specification;
   said datum specification having a datum identifier;
   said method specification having a method identifier and an arguments specification;
   said arguments specification having an arguments open terminal, at least one optional argument specification, and an arguments close terminal;
   said argument specification, if any, having said type specification and an optional argument identifier;
   said module specification optionally having a module predicates specification;
   said module content specification optionally having a module content predicates specification;
   said class specification optionally having a class predicates specification;
   said class content specification optionally having a class content predicates specification;
   said datum specification optionally having a datum predicates specification;
   said method specification optionally having a method predicates specification;
   said argument specification optionally having an argument predicates specification;
   said module predicates specification, said module content predicates specification, said class predicates specification, said class content predicates specification, said datum predicates specification, said method predicates specification, and said argument predicates specification, if any, each having a predicate open terminal, a predicate specification, a predicate close terminal, and, optionally, at least one additional predicate specification;
   said additional predicate specification, if any, having a preceding predicate specification, and said additional predicate specification separated from said preceding predicate specification by a predicate separator terminal; and
   said predicate specification and said additional predicate specification, if any, selected from the group consisting of a qualifier specification, a singleton specification, and a plurality specification;
   said qualifier specification having a qualifier terminal;
   said singleton specification having a singleton terminal and an object expression;
   said object expression selected from the group consisting of an identifier and a quote; and
   said plurality specification having a plurality terminal and at least one of said object expressions, said object expressions separated by an object separator terminal.

2. The software framework of claim 1, additionally comprising:
   said type specification selected from the group consisting of a void type specification, a value type specification, a reference type specification, and a compound type specification; and
   said reference type specification having said class identifier.

3. The software framework of claim 2, additionally comprising:
   said compound type specification selected from the group consisting of a reference sequence type specification, a value sequence type specification, a reference set type specification, a value set type specification, a index map type specification, a convert map type specification, a bind map type specification, and a scale map type specification.

4. The software framework of claim 1, additionally comprising:
   a class scope specification having a scope module identifier corresponding to said module identifier; a scope terminal; a class scope identifier corresponding to said class identifier; said class open terminal; said class content specification;
   and said class close terminal.

* * * * *